United States Patent
Conger et al.

(10) Patent No.: US 9,438,347 B2
(45) Date of Patent: Sep. 6, 2016

(54) OPTICAL MEDIA CONVERTER WITH EDGE-COUPLED FILTERING

(71) Applicant: Sanmina Corporation, San Jose, CA (US)

(72) Inventors: Robert Benjamin Conger, Huntsville, AL (US); David R. Porter, Huntsville, AL (US)

(73) Assignee: SANMINA CORPORATION, San Jose, CA (US)

( * ) Notice: Subject to any disclaimer, the term of this patent is extended or adjusted under 35 U.S.C. 154(b) by 3 days.

(21) Appl. No.: 14/278,004

(22) Filed: May 15, 2014

(65) Prior Publication Data
US 2014/0363169 A1 Dec. 11, 2014

Related U.S. Application Data

(60) Provisional application No. 61/800,682, filed on Mar. 15, 2013.

(51) Int. Cl.
*H04B 10/00* (2013.01)
*H04B 10/40* (2013.01)
*H04B 10/69* (2013.01)
*H04L 12/40* (2006.01)

(52) U.S. Cl.
CPC .............. *H04B 10/40* (2013.01); *H04B 10/69* (2013.01); *H04B 10/693* (2013.01); *H04L 2012/4028* (2013.01)

(58) Field of Classification Search
CPC .... H04B 10/2575; H04B 10/69; H04L 12/40
See application file for complete search history.

(56) References Cited

U.S. PATENT DOCUMENTS

| | | | |
|---|---|---|---|
| 4,641,378 A | 2/1987 | McConnell et al. | |
| 4,825,450 A * | 4/1989 | Herzog | H04L 12/40 375/258 |
| 8,478,127 B2 | 7/2013 | Chan et al. | |
| 2010/0040382 A1* | 2/2010 | Romagnoli | H04B 10/5563 398/187 |
| 2011/0243566 A1* | 10/2011 | Truong | H04B 10/40 398/116 |
| 2012/0027415 A1* | 2/2012 | Chan | H04B 10/504 398/115 |
| 2014/0055215 A1* | 2/2014 | Rogers | H01P 1/20336 333/206 |

OTHER PUBLICATIONS

Yeh, Y.C. "Design Considerations in Boeing 777 Fly-By-Wire Computers"; Nov. 1998; 9 pages.

* cited by examiner

*Primary Examiner* — Dzung Tran

(74) *Attorney, Agent, or Firm* — Loza & Loza, LLP; Julio M. Loza

(57) ABSTRACT

In one aspect, an optical media converter is provided for use within aircraft data networks. In one example, the optical media converter converts electrical doublet signals to optical Manchester signals, and vice versa. In an illustrative example, the optical media converter includes a receiver circuit coupled to a fiber optic port for receiving a Manchester-encoded input signal using an edge-coupled filter that filters out signals not associated with edges within the time-varying input signal Manchester signal. The optical media converter also provides, for example, for high common mode rejection and includes logic to correct for bit-width skew. The optical media converter is well-suited for use in converting doublet signals generated by a serial interface module of a line replaceable unit of an ARINC 629-compatible system into optical Manchester signals for transmission over a fiber optic bus system interconnected by a star coupler.

20 Claims, 25 Drawing Sheets

*Summary of Method for Converting Optical Manchester Signals to Electrical Doublet Signals using an Optical Media Converter (OMC)* 2400

2402 — Receive optical Manchester signals from an optic fiber via a ROSA using a receiver circuit having transimpedance amplifiers operative to generate amplified representations of a Manchester-encoded input signal wherein the representations are 180° out of phase with the one another for phase splitting and wherein a resistor connects positive reference pins of the transimpedance amplifiers to ground with sufficient resistance to substantially eliminate parasitic amplification and provide substantially complete common mode rejection.

2404 — Route the Manchester-encoded input signal through an edge-coupled filter having an amp configured to charge a filtration capacitor of an input stage of the receiver within one bit of a Manchester-encoded input signal to resolve a settling time of each bit a preamble is not needed, wherein the edge-coupled filter is characterized as filtering signals not associated with edges within the time-varying input signal.

2406 — Route the edge-couple filtered signals through a through a Schmitt-trigger comparator latch to hold a state of the signals until a next edge-triggered signal is processed.

2408 — Route an output signal of the Schmitt-trigger comparator latch through an optocoupler to couple analog signals from an analog portion of the OMC to digital signals for use in a digital portion of the OMC wherein an inductive power filter is employed including an inductive isolation component having coils connected in-line with analog circuit power supply lines to allow significant noise filtering.

2410 — Route the digital signals through a deskewing element to deskew edge-couple filtered versions of the Manchester-encoded input signals to obtain deskewed signals and then to route the deskewed signals through a doublet generator to convert the deskewed signals into electrical doublet signals for output over an electrical signal bus.

*FIG. 24*

OPTICAL MEDIA CONVERTER WITH EDGE-COUPLED FILTERING

CLAIM OF PRIORITY UNDER 35 U.S.C. §119

The present application for patent claims priority to Provisional Application No. 61/800,682 entitled "OPTICAL MEDIA CONVERTER" filed Mar. 15, 2013, which is assigned to the assignee hereof and hereby expressly incorporated by reference herein.

BACKGROUND

1. Field

Various features relate to optical media converters and, in particular, to an optical media converter for use in commercial aircraft.

2. Background

Many aircraft employ aircraft data networks for routing and sharing data and control signals among various components of the aircraft. One example is the ARINC 629 system developed by The Boeing Company for use in, for example, the Boeing 777 family of long-range wide-body twin-engine jet airliners. (Note that the acronym ARINC refers to Aeronautical Radio, Incorporated.) Briefly, the ARINC 629 data bus is a time division multiplexed (TDM) system that includes multiple transmitters with broadcast-type, autonomous terminal access. Terminal access is autonomous with each terminal listening to the bus to wait for a quiet period to transmit. Only one terminal is transmits at a time. After a given terminal has transmitted, protocol timers ensure that the terminal does not transmit again until all other terminals have had a chance to transmit.

More specifically, ARINC 629 data bus transmits current mode waveforms along a data bus cable. Individual avionics subsystems are installed in line replaceable units (LRUs) that transmit signals onto the ARINC 629 data bus using a serial interface module (SIM) connected to the data bus via a twisted-pair stub cable and a current mode coupler (CMC.) The SIM operates in conjunction with a terminal controller of the LRU and generates electrical doublet signals that are routed to the CMC via the stub cable for conversion to current mode waveforms for transmission of the data bus cable of the ARINC 629 bus system. The stub cable is a balanced connection with, for example, a 100Ω characteristic impedance. The current-mode electrical signal is routed to each of a set other LRUs connected to the bus via respective CMCs and stub cables. However, the electrical cable plant necessary to support the current-mode transmission format contributes significant weight to the airframe.

Therefore, it would be desirable to provide an alternative to the aforementioned CMC that could receive the same doublet signals and power but would substantially reduce overall bus system weight. It would also be desirable that such a device would minimize overall avionics systems impacts while allowing for the use of existing terminal controllers and SIMs (i.e. that the alternative device would permit a retrofit with existing LRUs so that the LRUs need not be modified and re-certified.)

SUMMARY

In one aspect, an optical media converter includes: an electrical port adapted to couple to an electrical signal line; a fiber optic port adapted to couple to an optic fiber; and an electro-optical converter configured to convert between electrical doublet signals for transmission on the electrical signal line and optical Manchester signals for transmission on the optic fiber, the electro-optical converter including at least one edge-coupled filter. The term electro-optical converter as used herein broadly refers to a device capable of converting electrical signals to optical signals, optical signals to electrical signals, or both. Hence, the term is not meant to imply that the device only converts from electrical to optical. For example, the electro-optical converter may convert electrical doublet signals to optical Manchester signals and also convert optical Manchester signals to electrical doublet signals. Note also that an edge-coupled filter is characterized as filtering signals not associated with edges within a time-varying input signal.

In an illustrative example, the electro-optical converter includes: a doublet-to-Manchester converter configured to convert electrical doublet signals to optical Manchester signals and a Manchester-to-doublet converter configured to convert to optical Manchester signals to electrical doublet signals. A receiver circuit is coupled to the fiber optic port for receiving a Manchester-encoded input signal using the edge-coupled filter. The edge-coupled filter is configured to charge a filtration capacitor of an input stage of the receiver circuit within one bit of a Manchester-encoded input signal. The receiver circuit also includes transimpedance amplifiers operative to generate amplified representations of a Manchester-encoded input signal wherein the representations are 180° out of phase with the one another for phase splitting. A resistor connects positive reference pins of the transimpedance amplifiers to ground with sufficient resistance to provide common mode rejection. The receiver circuit also includes a Schmitt trigger comparator latch to hold a state of a Manchester-encoded input signal to provide analog to digital burst mode conversion.

In the illustrative example, a power supply is provided that has an inductive power filter to isolate a power loop of an analog portion of the optical media converter from a digital portion of the optical media converter. An optocoupler is provided to couple analog signals from the analog portion to digital signals for use in the digital portion. The inductive power filter includes one or more inductive isolation components such as coils connected in-line with analog circuit power supply lines. A deskewing element is provided within the digital portion of the device to deskew edge-couple filtered versions of Manchester-encoded input signals to obtain deskewed signals. The deskewing element may be configured to detect a synchronization pattern within a word message in a Manchester-encoded input signal bit-stream and then align a time-base of a field-programmable gate array (FPGA) of the Manchester-to-doublet converter to the synchronization pattern of the word message. A doublet generator then converts the deskewed signals into electrical doublet signals.

In another aspect, an optical media conversion method for use with an optical media converter includes: receiving optical Manchester signals from an optic fiber; edge-couple filtering the optical Manchester signals; and converting the edge-couple filtered Manchester signals to electrical doublet signals for transmission on an electrical signal bus. The method also includes: receiving electrical doublet signals from an electrical signal bus signal bus and converting the electrical doublet signals to optical Manchester signals for transmission on an optic fiber.

In yet another aspect, an optical media converter includes: means for receiving optical Manchester signals from an optic fiber; means for edge-couple filtering the optical Manchester signals; means for converting the edge-couple filtered Manchester signals to electrical doublet signals for transmission on an electrical signal line; means for receiving electrical doublet signals from an electrical signal line and means for converting the electrical doublet signals to optical Manchester signals for transmission on the optic fiber.

BRIEF DESCRIPTION OF THE DRAWINGS

FIG. 24 summarizes a method for converting optical Manchester signals to electrical doublet signals using an OMC.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Figure 1:
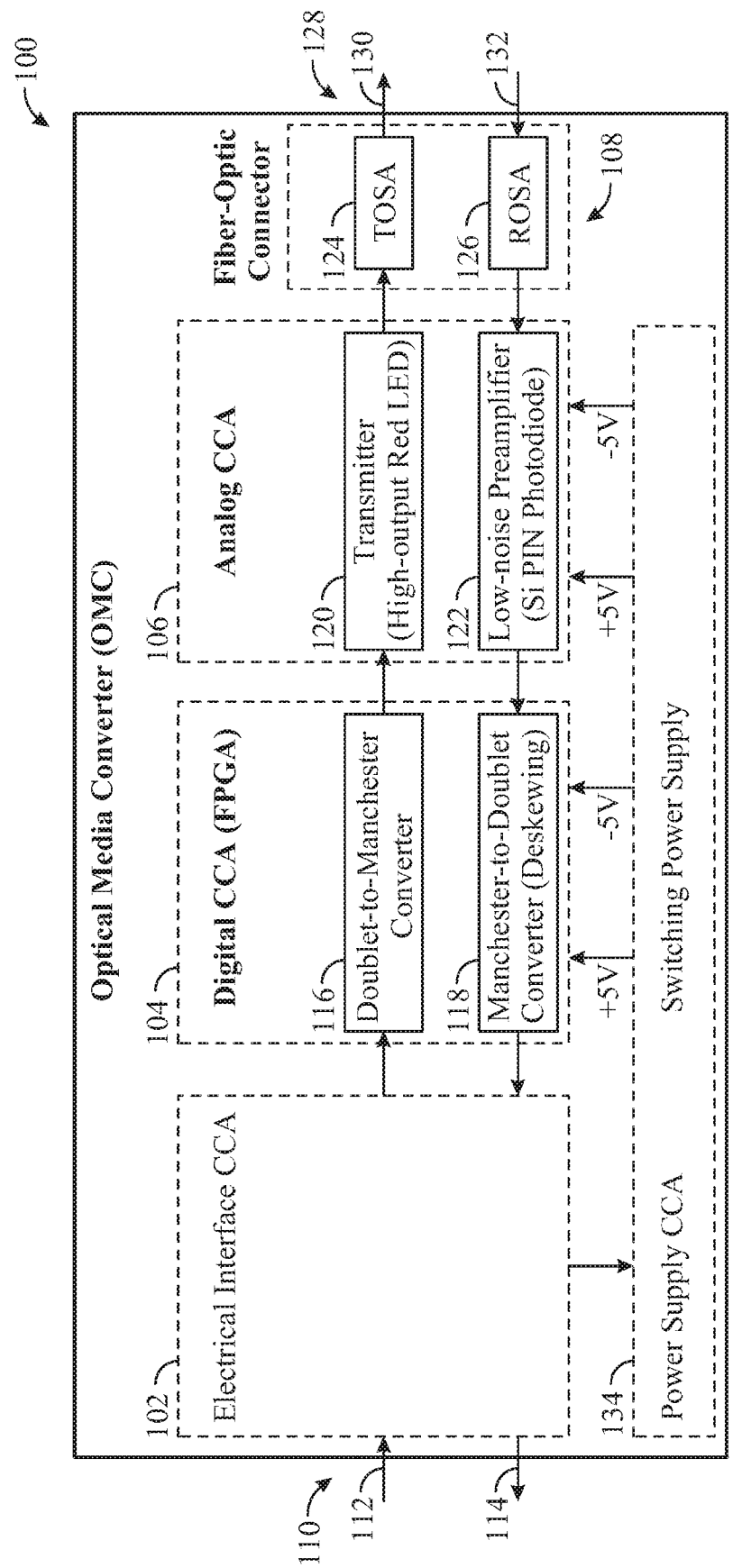
FIG. 1 is a block diagram of an exemplary OMC for use in an aircraft data network.

FIG. 1 provides a block diagram of an exemplary OMC 100 equipped to convert between electrical doublet signals and Manchester encoded optical signals. Manchester coding is also referred to as phase encoding and is a type of line code in which the encoding is based on signal transitions rather than whether a signal is high or low. Manchester coding has no DC component and is self-clocking. That is, Manchester encoding may be inductively or capacitively coupled and a clock signal may be recovered from encoded data. As such, electrical connections using a Manchester code may be galvanically isolated using a network isolator, i.e. a simple one-to-one isolation transformer. Generally speaking, Manchester encoding provides for frequent line voltage transitions that are directly proportional to a clock rate. The DC component of the encoded signal is not dependent on the data and carries no information, allowing a Manchester-encoded signal to be conveyed conveniently by types of media that usually do not convey a DC component. Each bit of data is transmitted in a fixed time or period with low-to-high and high-to-low transitions representing bits. For example, a high-to-low transition may represent a 0 wherein a low-to-high transition represents a 1.

Aspects of the systems, methods and apparatus described herein employ edge-coupled filtering, which is a type of AC coupled filter that differs from DC coupled filtering or conventional AC coupled filtering. Briefly, coupling refers to the transfer of energy from one medium to another, such as from an input optic fiber into the analog circuitry of a device. DC coupling allows both AC and DC signals to pass through the connection. AC coupling allows substantially only AC signals to pass through the connection. Filtering generally refers to the elimination of unwanted components of a signal. Edge-coupling or edge-coupled filtering, as the term is used herein, refers to a type of AC coupled filtering that retains the frequency information corresponding to edges within a the and removes much of the rest, i.e. edge-coupled filtering operates to filter out signals not associated with edges or transitions in an input signal. Hence, an edge coupled filter is characterized as filtering signals not associated with edges or transitions within a time-varying input signal.

The principal components of the OMC 100 include an electrical interface circuit card assembly (CCA) 102, a digital CCA 104 (which may be designed and fabricated as an FPGA), an analog CCA 106 and a fiber-optic connector 108. The electrical interface CCA 102 is coupled to a SIM data bus 110 (which is in turn connected to an LRU not shown in FIG. 1) for receiving and transmitting electrical doublet signals along a first electrical bus line 112 and a second electrical bus line 114. That is, electrical interface CCA 102 contains the termination for the electrical connector that mates to the stub cable of a SIM bus within an LRU.

(Additionally, the electrical interface CCA 102 board may include power supply circuitry used for soft-starting the power supply 134, discussed below.) Note that the electrical interface CCA 102 also may be referred to as a stub interface and may include various transformers and a rectifier, not shown in FIG. 1.

The digital CCA 104 includes a doublet-to-Manchester converter 116 for converting electrical doublet signals to Manchester optical signals and a Manchester-to-doublet converter 118 for converting Manchester optical signals to electrical doublet signals via FPGA components that maintain receiver bit symmetry. The Manchester-to-doublet converter 118 includes deskewing components provided, at least in part, because edge-coupled filters are employed within the OMC rather than DC-coupled or AC-coupled filters. The digital CCA 104 may have several small low drop-out regulators (LDO) that supply voltages necessary for operating the FPGA. The FPGA device is employed, as will be described below, to create Manchester-encoded signals from doublets and for deriving doublets from the received data stream from the fiber-optics.

The analog CCA 106 includes a high-output red LED transmitter 120 for transmitting Manchester optical signals and a low-noise preamplifier Si positive-intrinsic-negative (PIN) photodiode 122 for receiving Manchester optical signals. The analog CCA 106 board is, in at least some examples, a full fiber-optic transceiver capable of transmitting and receiving 2 Mbit/s data. The LED transmitter and the PIN photodiode receiver parts are mounted to the board and the board itself has mount points for attaching the various optical sub-assemblies.

Manchester signals are transmitted onto a fiber optic data bus 128 via at least one fiber output line 130 using a transmit optical sub-assembly (TOSA) 124 of the fiber optic connector 108. Manchester signals are received from the fiber optic data bus 128 via an input line 132 using a receive optical sub-assembly (ROSA) 126 of the fiber optic connector 108. That is, the physical interface to the fiber-optic medium includes the TOSA and the ROSA, which contain the light-emitting diode (LED) and the PIN photodiode used to transmit and receive light, respectively. The fiber optic data bus 128 may be, for example, an ARINC 629-compatible fiber optic data bus having a star coupler (not separately shown) for merging and mixing a set of optic signals provided along a set of fiber optic lines. Power for the OMC is provided by a power supply CCA 134, which is a switching power supply. Note that a set of switching regulators residing on the power supply CCA 134 generates the primary power supplies. In one example, the voltage rails generated are 5 VDC and −5 VDC. With the exception of one low-current reference voltage, all other voltages in the OMC are derived from these two supplies.

Predecessor ARINC 629 current-mode data buses were constructed as passive broadcast busses and so the OMC 100 is designed to operate in this manner as well for compatibility with existing LRU hardware. The predecessor current-mode data bus connected each device serially as stubs off a main cable. Optically, it is therefore advantageous to have each transmitter enter a coupling device that routes the data traffic to each receiver. This can be accomplished using an active star, i.e. an optical router (not shown), that terminates all OMC transmitters and regenerates traffic that is then sent to the receive ports. Such a design may require a relatively large apparatus, which can impact system complexity and power consumption. As an alternative, a passive star (shown in FIG. 20, discussed below) may be employed that splits a transmitter's light to each receiver port. The passive star is a relatively simple apparatus but requires more optical power to split the signals among the receiver ports. In at least some practical aircraft implementations, the data bus architecture requires that forty ports be supported. This constraint, along with other de-rated system optical losses, leads to a design goal of a total optical power budget of 40 dB for the OMC. That is, the difference between the light injected into the fiber-optic cable down to the minimum light level detectable at a receiver must be at least 40 dB, in some applications.

An exemplary system for use with ARINC 629 consists of terminal controllers (within LRUs) that communicate with each other serially, using 2 Mbit/s Manchester, through the SIM of the LRU. The data bus is a multi-point avionics architecture that allows all terminals on the bus to exchange information at regular intervals (5 ms or 25 ms.) In addition to the doublet signaling, the SIM controls the availability of a 30 VDC common-mode power supply that shares pins with the signal wiring. The 30 VDC supply is utilized to power the OMC. That is, the OMC takes the same power and doublets from a conventional SIM and then sends a Manchester-encoded signal down a 1 mm plastic optical fiber cable using 650 nm light. The weight savings can be considerable over predecessor systems while nevertheless providing a convenient retrofit to existing LRUs.

Note that a 40 dB optical power budget on a 2 Mbit/s data link is considerable. To achieve this goal, either high output power or high input sensitivity (or both) may potentially be exploited. The first approach (high output power) involves generating a large amount of light from the OMC transmitter. There are typically two choices for transmitter elements, LEDs and laser diodes. The LED approach, however, is limited by technology in the LEDs, which will not typically generate much more than 0 dBm of optical power owing to their logarithmic output intensity versus input current behavior. Conversely, laser diodes often have significant advantages in output optical power, as such devices have an exponential relationship between output optical power and input current. This relationship, however, is not typically sufficiently stable over wide temperature ranges. The second approach (high input sensitivity) involves making a highly sensitive receiver circuit capable of picking up small amounts of light. With a sufficiently sensitive receiver, an LED can be utilized, which can provide gains in reliability, cost, eye-safety, and temperature performance over laser diodes. This latter approach is the one exploited by the OMC of FIG. 1 (and by the other devices and components described herein.)

At least some of the features of the OMC 100 described herein are:
  Converts Electrical Doublets to Optical Manchester
  Converts Optical Manchester to Electrical Doublets
  Receiver utilizes sensitive edge-coupled amplifier circuit
  Transmitter utilizes high-power LED
  FPGA contains logic to maintain receiver bit-symmetry
  FPGA contains LED fault isolation logic
  High receiver circuit common-mode noise rejection.

Figure 2:
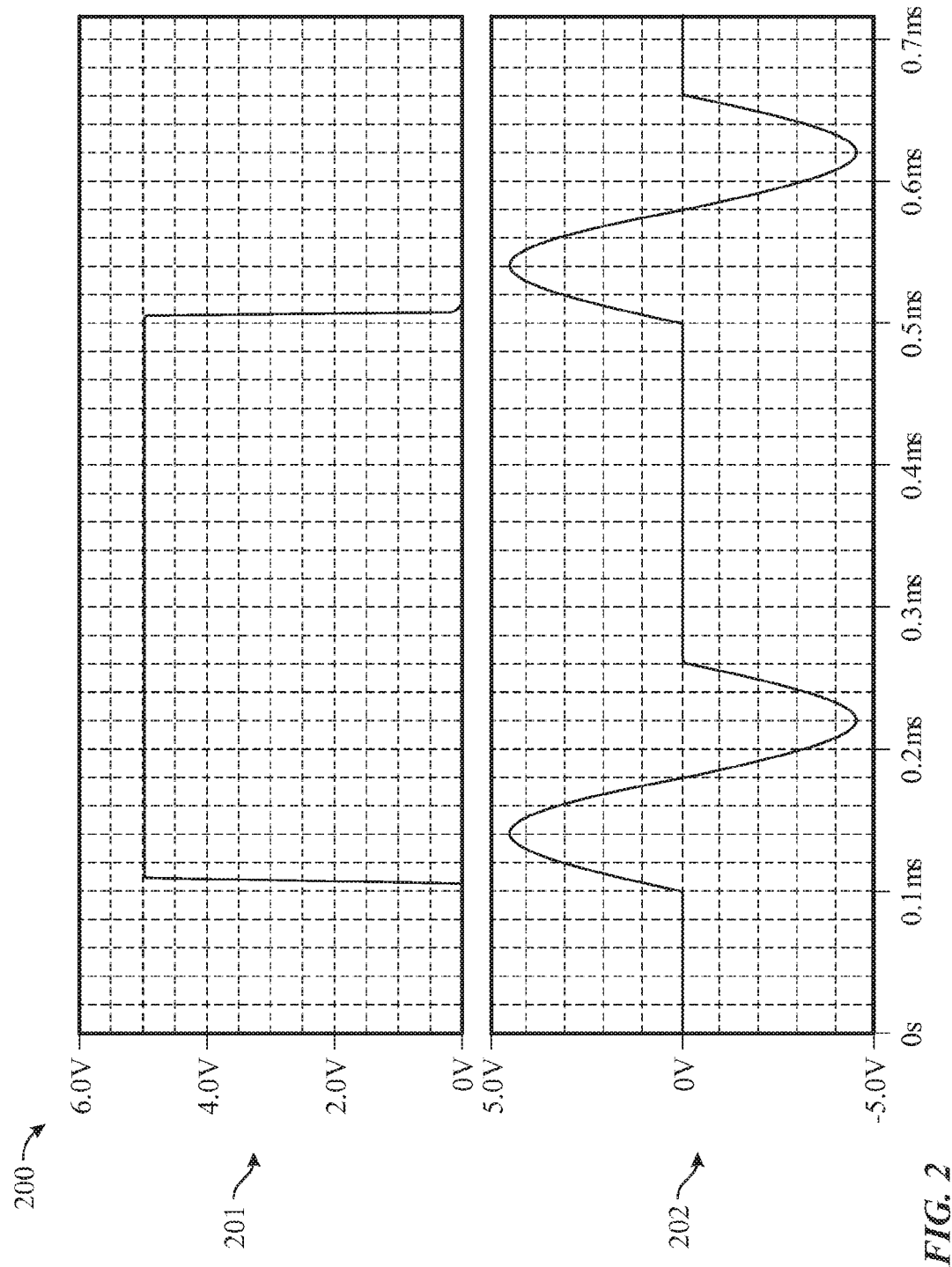
FIG. 2 illustrates Manchester encoded pluses and corresponding electrical doublets converted by the OMC of FIG. 1.

FIG. 2 illustrates an exemplary trace 200 of a Manchester signal and a trace 202 of a corresponding electrical doublet signal. Note that the Manchester signal 200 is a unipolar signal with no negative component. Generally speaking, the Manchester signal is either on or off and it is the transition between these states (the edges) that corresponds to data bits. In contrast, the electrical doublet signal 202 is a bipolar signal, which swings between positive and negative values, as shown. That is, the doublet signal 202 is a narrow-band signal, which consists of a single sine-wave period representing a corresponding Manchester bit edge transition. Note also that doublets are relatively high frequency waveforms compared to Manchester signals and so, if a device transduces doublets without intermediate Manchester signals, noise may be problematic. Manchester allows for retention of the same information but at a lower bandwidth. Often, the primary design concern is sensitivity and the use of Manchester signals generally allows an improvement in sensitivity. Still further, within legacy avionics systems, encoders were employed that used Manchester signals but these signals were then converted to doublets to, for example, provide a more asynchronous system and avoid electromagnetic interference (EMI.) Still further, when one translates from the balanced bipolar doublet scheme to a Manchester optical scheme, the resulting optical signals are unipolar (i.e. only one polarity), and so the systems described herein provide solutions that allow for a single-polarity Manchester signal. As will be further explained, rarely-used circuit techniques are employed to address this issue while avoiding the need for a pre-amble, as may be required in AC-coupled systems. For example, edge-coupled filters are employed to filter out everything from input Manchester waveforms except the edges of interest. In this regard, the edge-coupled filters are configured resolve a settling time for a bit within a first bit of a series of input bits so that there is no need for a preamble. This is different from typical edge-coupled filters and is provided, at least in part, because one of the intended uses of the OMC 100 is in connection with ARINC 629 systems and protocols that do not permit preambles. The OMC 100 also provides necessary corrections to retime signals so the output signal can be pristine.

Transimpedance Amplifiers

FIG. 2 illustrates a first stage inverting transimpedance amplifier (TIA) 300 with filter capacitor 302 for use within the fiber optic receiver of FIG. 1 (i.e. for use within the low-noise preamplifier 122 of analog CCA 106.) Before discussed the TIA 300, some background regarding TIA design will be summarized. A TIA is advantageous for use within fiber optic receivers because photodiodes create a photocurrent that is proportional to input light. A TIA converts the input current into a proportional voltage signal. A low noise TIA is optimized to minimize noise and maximize the signal. TIAs have gain that is expressed in ohms. The transimpedance operation is accomplished by forcing an amplifier to create the voltage directly (i.e. an inverting TIA) or by having the input current converted into a voltage through a resistor and then amplified (i.e. a non-inverting TIA.) In the inverting TIA, current is fed into the virtual ground of an amplifier. The amplifier will cancel out this current by generating an output voltage. Due to Ohm's Law this creates an output voltage that is the input current multiplied by a feedback resistance ($R_r$.) Conversely, non-inverting TIAs, valid for very low-speed designs, feed the current source into a ground resistor ($R_g$) and then have the resulting voltage amplified by a voltage-gain amplifier circuit. Either TIA style can be utilized in low-speed multi-mode optical networks, but inverting TIAs are considered the most commonly used approach and hence will be covered in more depth herein. The non-Inverting TIA approach is significantly bandwidth limited due to the RC time constant formed at the input between the ground resistor and an amplifier input capacitance (Cd.) This is prohibitively limiting for most applications in terms of bandwidth and bandwidth accuracy and hence is not preferred for use with the OMC of FIG. 1.

Insofar as amplifier gain and bandwidth are concerned, amplification circuits preferably balance signal gain with bandwidth. Increasing one of these two quantities typically forces a reduction in the other. Voltage-gain amplifiers quantify this tradeoff with a metric: the Gain-Bandwidth Product (GBP). TIA bandwidth can be obtained by converting the GBP. Below is the approximate equation governing the conversion of amplifier GBP into transimpedance bandwidth:

$$f_{3db\ TIA} = \sqrt{GBP/2\pi R_f C_d} \qquad (1)$$

where $R_f$=gain-setting resistor; $C_d$=amplifier input network capacitance lumped together (photodiode and amplifier); and GBP=Gain-Bandwidth Product of a particular amplifier.

Very large signal gains are possible in a transimpedance approach. If the amplifier has a GBP of 1600 MHz, a transimpedance target bandwidth of 5 MHz, and a Cd of 9 picoFarads (pF), then gains as high as 1E6Ω are possible. An important consideration for photodiode circuits is that the current is unipolar (i.e. it will not swing about a reference but rather deviate in one direction and then return to the rest state.) This is different from radio circuits where the signal is bipolar. A major consequence of this is that AC-coupling for bandwidth limitation will create a circuit settling time unless the circuit design is handled carefully.

Insofar as amplifier noise is concerned, TIA electronic noise has two components, current noise and voltage noise. The noise occurs naturally in semiconductors at the input-stage of an amplifier. Subsequent gain stages typically contribute very little noise to the amplifier output as gain stage noise does not have as much signal gain as the sensor input stage. There are three technologies currently being utilized in common amplifiers. The general tradeoffs are summarized in the table below for bipolar designs, junction gate field-effect transistor (JFET) designs and complementary metal-oxide-semiconductor (CMOS) designs.

TABLE I

|  | Bipolar | JFET | CMOS |
| --- | --- | --- | --- |
| Voltage-Noise | Low | Medium | Medium |
| Current-Noise | Very high | Low | Medium |
| Gain-bandwidth (GBW) | High | Medium | Low |
| GBW/Watt | Low | Medium | High |
| Slew Rate | High | High | Low |
| Input Leakage | High | Very Low | Low |

The first two rows in Table I contain the most relevant information, which are the amplifier noise metrics. The other features also matter, especially slew rate and input leakage, but the noise features show why JFET is the preferred technology for sensor applications. Photodiode sensors generate their own current noise, but this noise can often be discounted as a minor contribution. Below is the approximate equation for transimpedance noise behavior:

$$I_{eq} = \sqrt{I_n^2 + \frac{4KT}{R_f} + \left(\frac{E_n}{R_f}\right)^2 + \frac{(E_n 2\pi C_d F)^2}{3}} \qquad (2)$$

where:
$I_{eq}$=Equivalent input noise current if the output noise is band-limited to $F < 1/(2nR_F C_F)$.
$I_n$=Input current noise for the amplifier input.
$E_n$=Input voltage noise for the amplifier.

$C_d$=Diode capacitance and amplifier input capacitance lumped together.
F=Amplifier circuit 3 dB bandwidth in Hz times ~1.2.
$R_f$=Gain-setting resistance
$C_f$=Bandwidth limiting capacitance
K=Boltzmann's Constant (1.3806488(13)×10~23 J/K)
T=Temperature in Kelvin Note that for large $R_f$, the noise terms in Equation 2 become the current noise of the amplifier and the final term is proportionate to the input capacitance and the voltage noise of the amplifier. Note also that the impedance of a capacitor is inversely proportionate to the capacitance value. The noise current induced by voltage noise through the input capacitance is thus proportionate to the capacitance itself.

Figure 3:
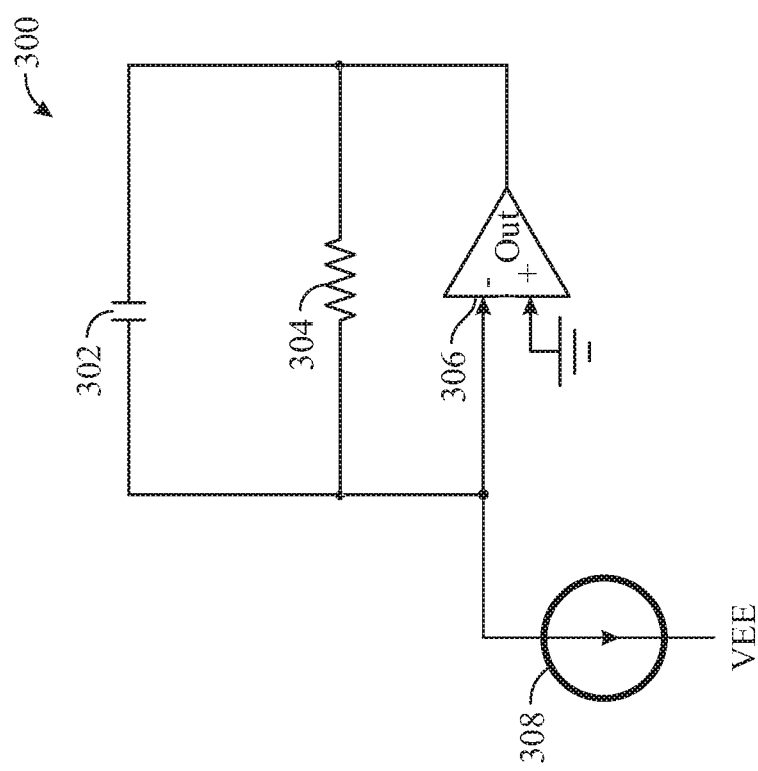
FIG. 3 is a schematic diagram of a first stage inverting transimpedance amplifier with filter capacitor for use in the OMC of FIG. 1.

With the foregoing in mind, note that the TIA 300 of FIG. 3 includes a filter capacitor 302 in parallel with a gain setting resistor 304, which are interconnected as shown with an operational amplifier 306 with a current source 308. As with the inverting TIA design discussed above, the input current is fed into the virtual ground of the amplifier. One reason for this is to set the bandwidth precisely, instead of allowing the bandwidth to drift with temperature variations within the amplifier. The overall result is a low-pass filter that creates a slow rise-time pulse upon receiving digital light pulses.

Figure 4:
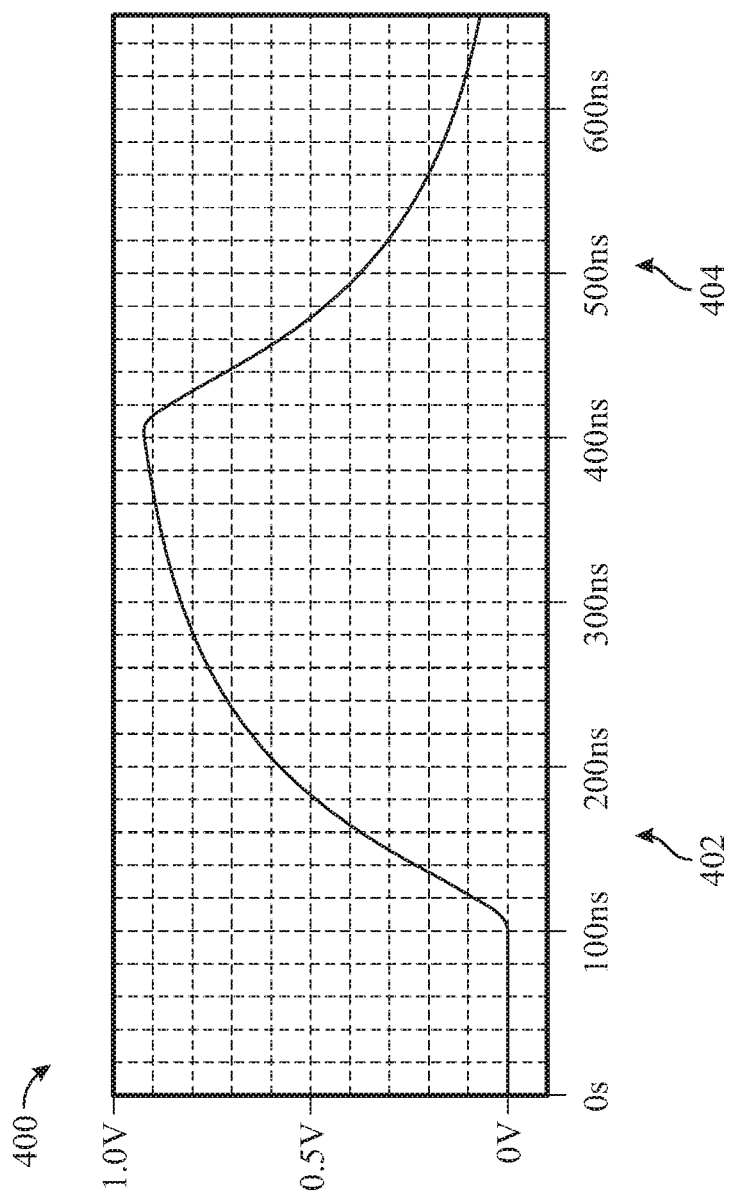
FIG. 4 illustrates an exemplary unipolar output of the transimpedance amplifier of FIG. 3.

FIG. 4 illustrates a slow rise-time pulse or waveform 400. The pulse 400 includes a generally saw-toothed shape having a rising portion 402 and a trailing portion 404. One significant feature of the pulse above is that it is unipolar. Also, the signal rise-time is slow with respect to the bit-time. One potential issue is that any reduction in bandwidth at the lower end of the spectrum would result in a settling-time, which often cannot be tolerated as it would mandate a preamble in the bit stream. The signal usually has been filtered at the high-end of the spectrum but can also be filtered at the low-end because the edges alone contain the information required to recover the bit. That is, a bit is defined as two transitions in time. Post-processing of a unipolar Manchester signal can be achieved by utilizing edge-coupling, which is a modified type of AC filtering that retains the frequency information corresponding to the edges of the signal and removes much of the rest. This method also reduces electronic noise by removing spectrum that is not necessary for signal processing to occur.

Figure 5:
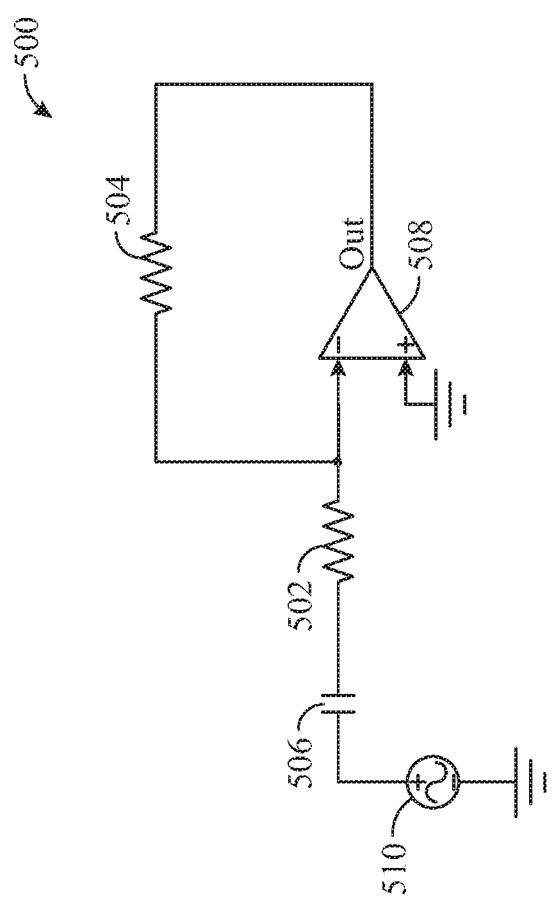
FIG. 5 is a schematic diagram of an edge-coupled filter for use in the OMC of FIG. 1.
Figure 6:
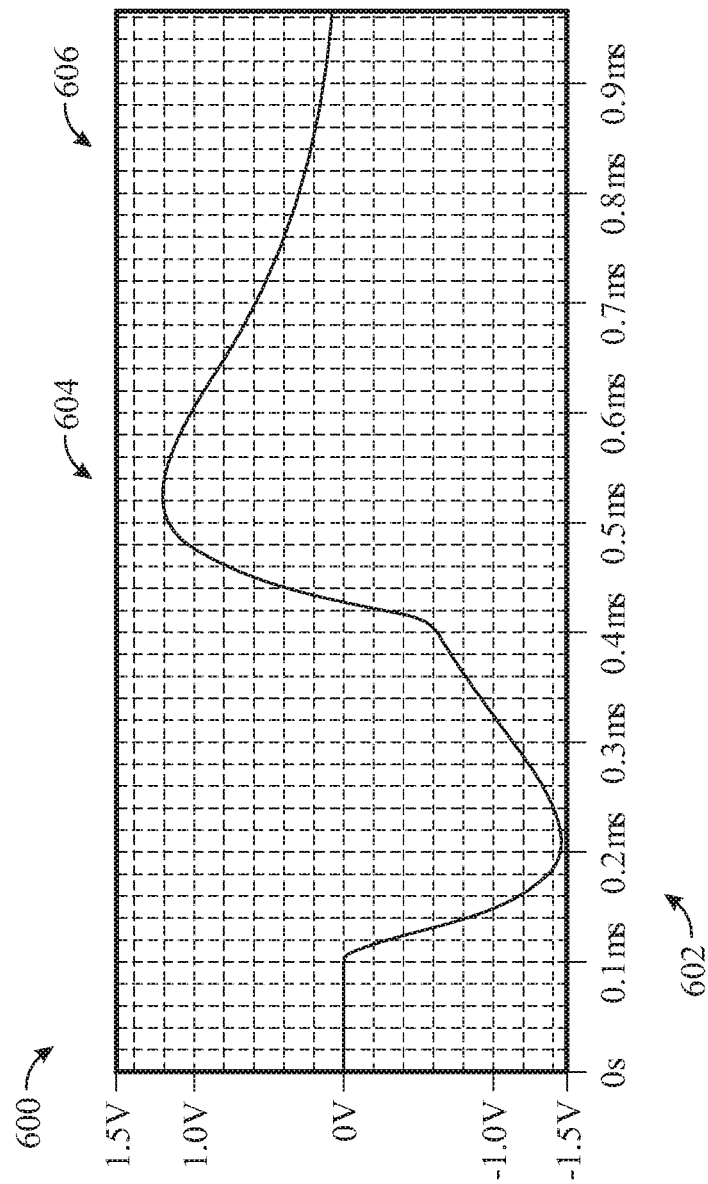
FIG. 6 illustrates an output of the edge-coupled filter of FIG. 5.

FIG. 5 illustrates such an edge-coupled filter 500, which includes resistors 502 (R1) and 504 (R2) and a capacitor 506 (C1) connected, as shown, with an amplifier 508 and a signal source 510. FIG. 6 illustrates an exemplary output signal 600 generated by the edge-coupled filter, which is a bipolar signal having a first negative phase 602 and a second positive phase 604. Note that the second positive phase 604 includes a gradually tapering tail 606. The edge-coupled result is now bipolar and contains all the information necessary to resolve the Manchester-encoded signal back into bits. The lower frequency bandwidth is removed to improve noise performance and a secondary amplifier filter stage has the potential for signal gain as well. One additional benefit of edge-coupling is that there is effectively no settling-time because the time-constant associated with the filter is smaller than the bit-time. The final stage of the amplification network is a comparator, built with hysteresis, such that the peaking of the filtered signal reliably triggers the comparator but noise rarely can inadvertently trigger the comparator. The function of the comparator thus becomes that of a Schmidt trigger. The network thereby creates the (near) optimal bandwidth reduction that can be achieved for this variety of bit-signaling, as well as allowing for burst mode data reception due to the minimal settling time. Further with regard to the edge-coupled filters used in the OMC, edge-coupled devices used for other applications typically do not filter tightly since they cannot let the corresponding comparator give up the bit level. Hence, a comparator circuit is used herein with the edge-coupled filter of the OMC 100 that is non-traditional. The comparator circuit uses the Schmitt trigger latch to hold the state until the negative part of the wave comes through. This reduces noise at or near the maximum amount possible. Note also that Schmitt triggers are traditionally used to reject noise within an envelope, particularly if the signal is noisy or has a slow transition time. However, with the Schmitt trigger of the OMC 100 described herein, the Schmitt trigger is instead used to hold the state.

Turning now briefly to bit error rates and sensitivity, signal sensitivity can be defined as the point at which a signal can be discerned from the background noise. For a digital bus this means that the bit-error rate (BER) is 50%. This is a satisfactory answer mathematically but practical buses require a lower BER to be useful. For a target 10E-9 BER, a signal should have six times the power of the noise power. Measuring the noise power in circuit and then derating it for the proper BER yields an input referred signal current representing the sensitivity. However, PIN photodiodes do not have a one-to-one conversion of optical power to photocurrent. Typically, PIN photodiodes convert at a ratio of 0.4 Amps/Watt to 0.6 Amps/Watt. As such, the sensitivity is approximately 3 dB less than the implied level measured electronically.

Electrical Signal Interface (i.e. the Stub Interface)

Figure 7:
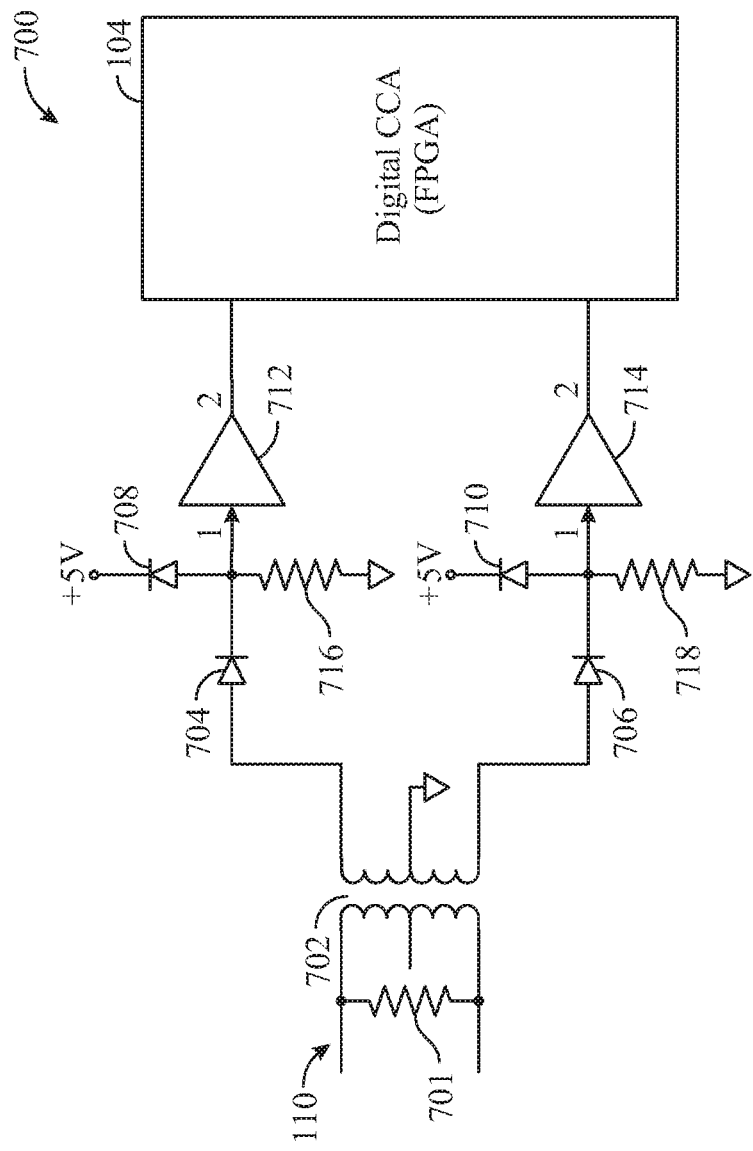
FIG. 7 is a schematic diagram of a transmit signal path of an electrical interface component of the OMC of FIG. 1.

FIG. 7 illustrates stub transmit signal path components 700 of the electrical interface CCA 102 of FIG. 1. Note that these components are referred to as transmit path components because they are involved in relaying doublet signals received from SIM data bus 110 to the digital CCA FPGA 104 for eventual transmission over the fiber optic bus 128 (shown in FIG. 1.) The two lines of bus 110 are coupled via a resistor 701. Input doublets are coupled from a 1:2 input transformer 702 and a network of diodes 704, 706, 708 and 710 separates the positive and negative doublet lobes from each other. The doublet lobes are then converted to digital pulses using a level-shifting buffer composed of amps 712 and 714 and fed into the digital CCA FPGA 104, as shown. Resistors 716 and 718 connect to grounds, as shown. Note also that doublet inversion is a possible action taken by a SIM on an LRU if it detects problems with a doublet count. The dual-input approach of FIG. 7 allows for a minimum delay detection of the doublet in either polarity while enabling each input to interpret either doublet polarity if one input were not functional.

Figure 8:
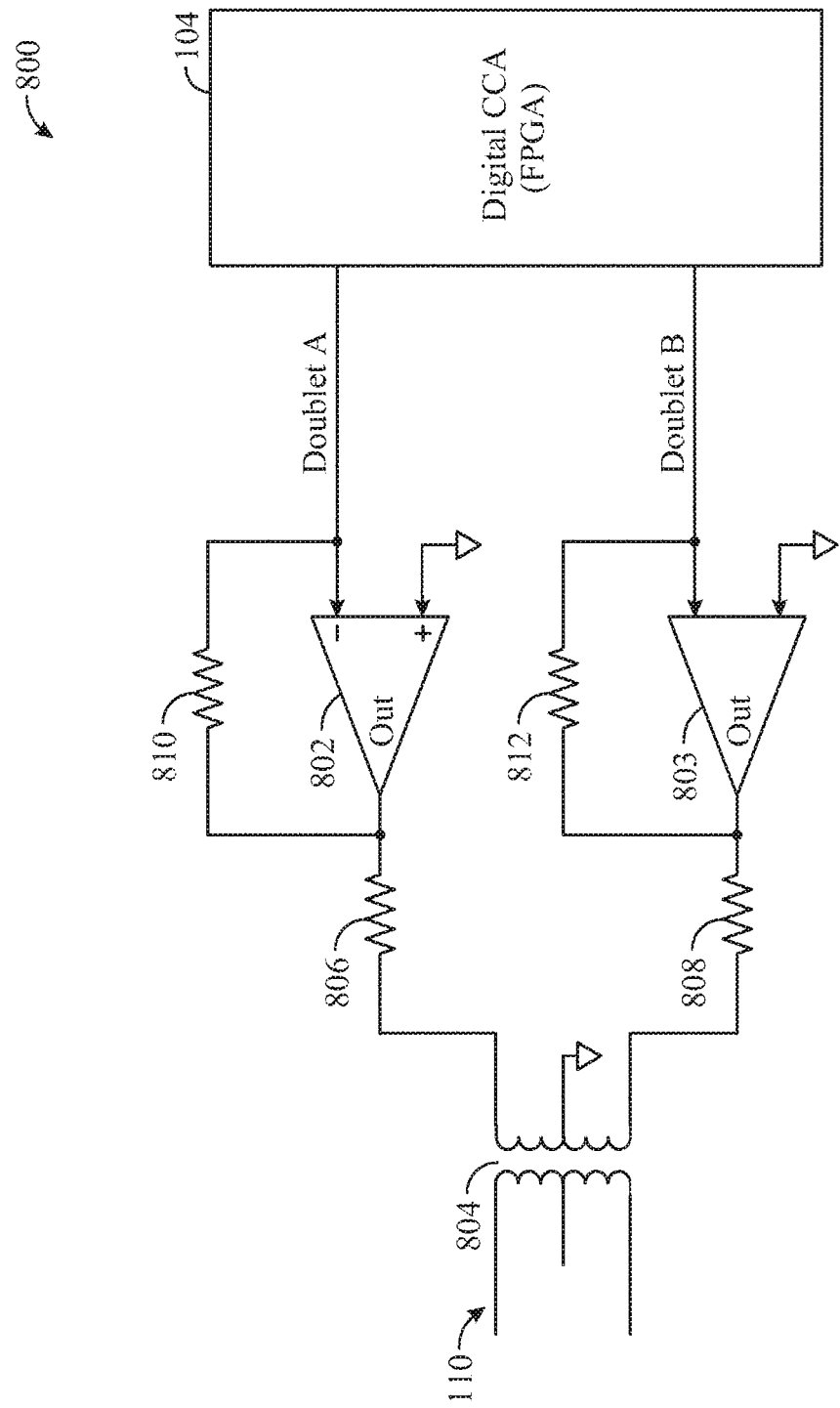
FIG. 8 is a schematic diagram of a receive signal path of the electrical interface component of the OMC of FIG. 1.

FIG. 8 illustrates stub receive signal path components 800 of the electrical interface CCA 102 of FIG. 1. These components are referred to as receive path components because they are involved in relaying the doublet signals (which have been converted from Manchester signals received from the fiber optic bus 128) to the SIM bus 110 for reception by components of an LRU. Two high current drivers (amps) 802 and 803 accept doublet pulses (doublet A and doublet B, respectively) from the digital CCA FPGA 104 and feed the pulses into a 1:3 receive transformer 804 via resistors 806 and 808. Feedback resistors 810 and 812 are also connected as shown. The transformer and the amps are also connected to ground, as shown.

Power Supply and Power Paths

Figure 9:
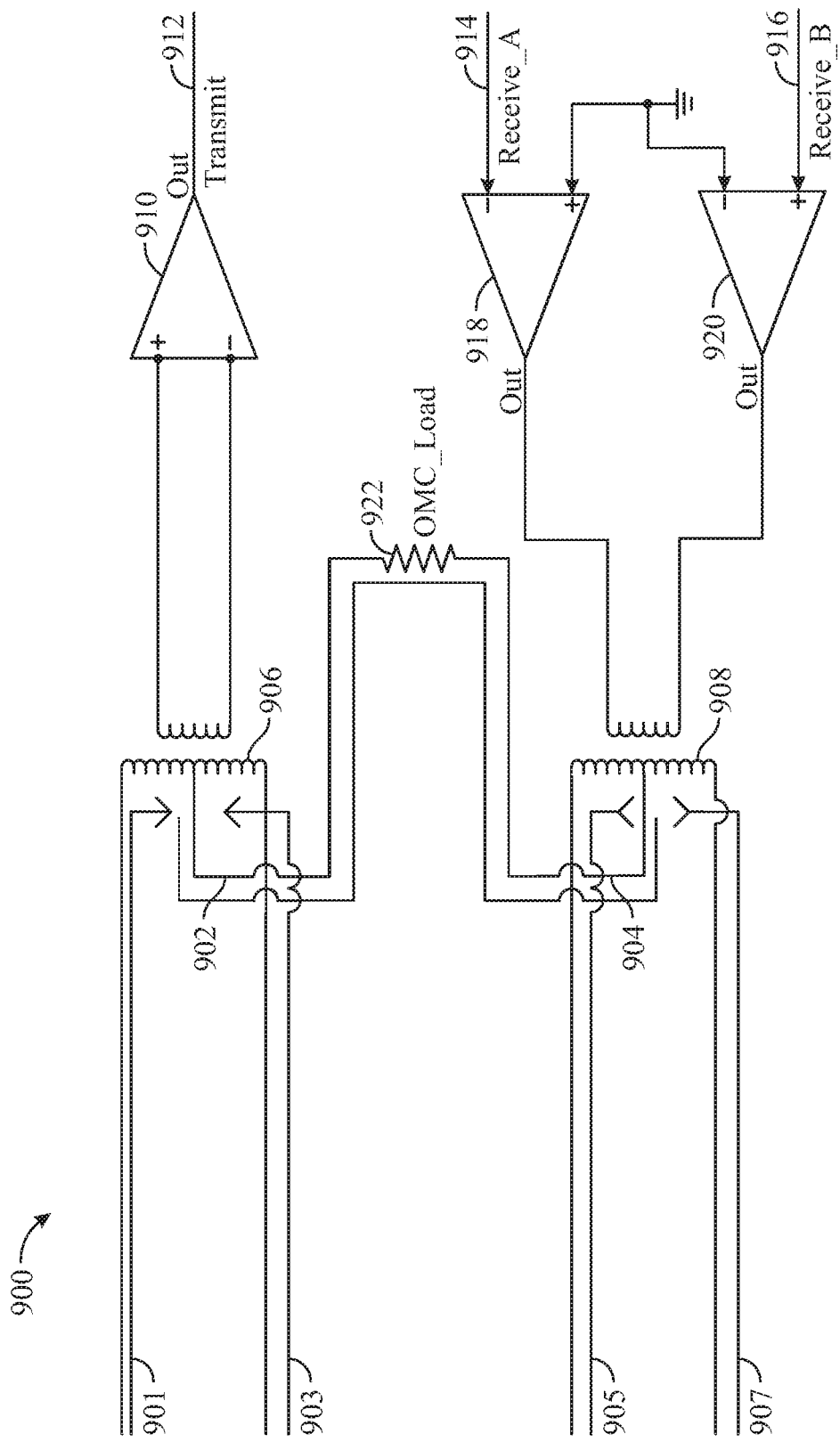
FIG. 9 is a schematic diagram of a DC power path of the OMC of FIG. 1.
Figure 10:
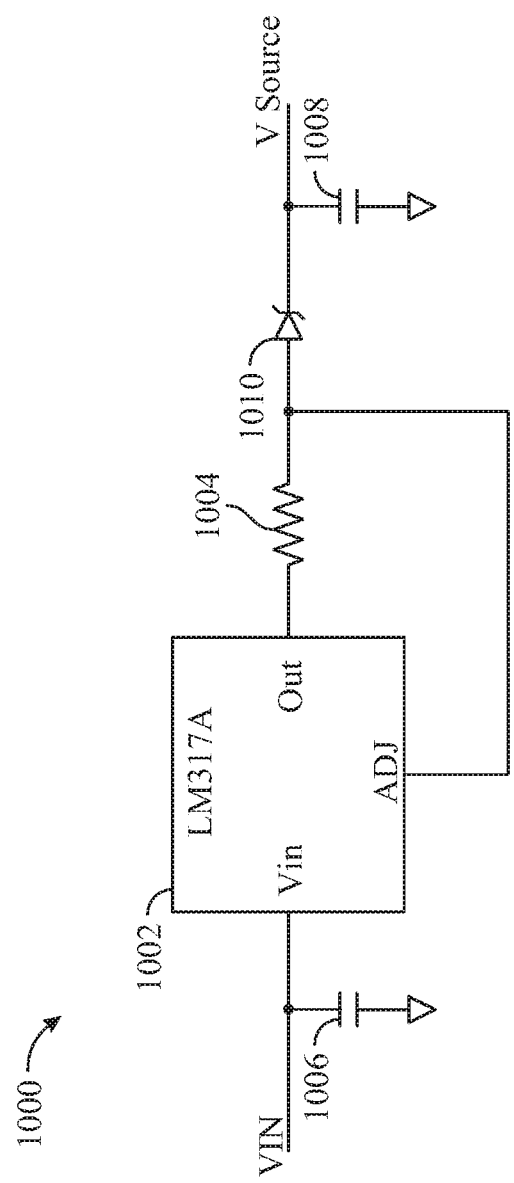
FIG. 10 is a schematic diagram of a soft start ramp circuit of a power supply of the OMC of FIG. 1.

FIGS. 9 and 10 illustrate various aspects of the power supply 134 and power paths of the OMC 100. Briefly, the power path is designed to meet certain goals or requirements for use with the SIM of an ARINC 629-compatible system. The SIM supplied input power is common-mode 30 VDC±5%. The current draw does not exceed 620 mA for greater than 32 μs after start up. The current draw does not exceed 620 mA for greater than 64 μs at start up. The current draw, however, does exceed 400 mA at start up. The system is powered and operational within 5 ms. The OMC 100 does not draw more than 310 mADC.

Considering, now, the power paths 900 shown in FIG. 9. Line 901 is a STUB_TRANSMIT_A SIGNAL+ line at 15 V. Line 903 is a STUB_TRANSMIT_B SIGNAL− line at 15 V. Line 905 is a STUB_RECEIVE_A SIGNAL+ line at −15 V. Line 907 is a STUB_RECEIVE_B SIGNAL+ line at −15 V. The common-mode 30 VDC (which is fed from the SIM through the stub cable) enters the OMC 100 through a set of signal transformer center-taps, 902 and 904. This is done through both wires in transmit and receive pairs, which creates opposing magnetic flux in the core of each transformer core 906 and 908. The net effect is that the DC current does not contribute to magnetic saturation of the cores while decoupling the DC signal component from the AC signal component. Transformer 906 is also coupled through an amp 910 to transmit path 912. Two receive paths 914 and 916 are coupled through respective amps 918 and 920 to transformer 908, as shown. Note also that the center taps of the transformers 906 and 908 are coupled together via an OMC load resister 922, as shown.

FIG. 10 illustrates a soft start ramp circuit 1000 of the power supply 134. The circuit 1000 includes a linear voltage regulator 1002 (in this example, an LM317A) interconnected, as shown, with a resistor 1004 (R7), capacitors 1006 and 1008 (C12 and C3), and a Schottky diode 1010 (D5). Exemplary values are 1 μF for capacitor 1006, 10 μF for capacitor 1008, and 2.7 ohms for resistor 1004. The Schottky diode may be an mss1p4 device. In predecessor CMC devices, the CMC device ran op-amps directly off the 30 VDC input supply. Current draw for CMC logic functions was supplied with a small low dropout (LDO) regulator. This approach would not likely work for the OMC 100 due, at least in part, to the appreciably larger current necessary at voltages at 5 VDC and below. This motivated the use of switching regulators for their greater efficiency in the OMC. Note that switching regulators typically require the use of sizable input and output capacitors. If those capacitors were left to ramp naturally at start up, they could draw peak amperage as high as 40 amps that would then trip the power sourcing device (the SIM) and cause it to cut the supplied 30 VDC because high current draws are interpreted by the SIM to be a short circuit.

Moreover, in the predecessor CMC devices, the in-rush current was limited to that for a 2.5 μF capacitor at 30 VDC. This small sized capacitor would charge in time to meet the timing requirements of the SIM. The OMC 100 switching regulators, however, should not present such a small load to the SIM and thus the OMC 100 instead provides soft-start features for both the input capacitor stage and the outputs of the 5 V DC and the −5 VDC switching supplies. Additionally, the SIM can require current draws over 400 mA at start up. In the predecessor CMC devices, a 2.5 μF input capacitor was passive and would naturally allow this to occur. The OMC 100 should therefore intentionally allow a precise current into its input-stage to satisfy both of the SIM's out-rush criteria.

Note that FIG. 10 shows the input soft-start circuitry 1000 without the input rectifier shown. A rectifier is used because the SIM has two potential modes of operation where it can apply 30 VDC or −30 VDC with respect to the power inputs depicted in the figure. Capacitor 1008 (C3) is the target capacitor in the soft-start circuit. If the capacitor were allowed to see a 30 VDC signal applied within microseconds it would sink upwards of 40 amps peak. The SIM requires that the in-rush event be below 620 mA within 64 μs of start up, which will not happen with such a capacitor alone. The remaining circuitry operates to linearly ramp the voltage on C3 such that the current into it is nearly constant and below the 620 mA limit. Additionally, this circuit fixes the input current to 463 mA (±12 mA) to satisfy the SIM's minimum out-rush requirement. When the input voltage at VIN is ramped, the LM317A will create a 1.25 VDC signal between the OUT and ADJ pins of the LM317A. Resistor 1007 (R7) works through Ohms Law to create a constant current through the OUT pin and into the pseudo-ground created because capacitor 1008 (C3) is an empty capacitor. The trade-off is that during the charging of capacitor 1008 (C3) a large wattage is temporarily dissipated in the LM317A.

Figure 11:
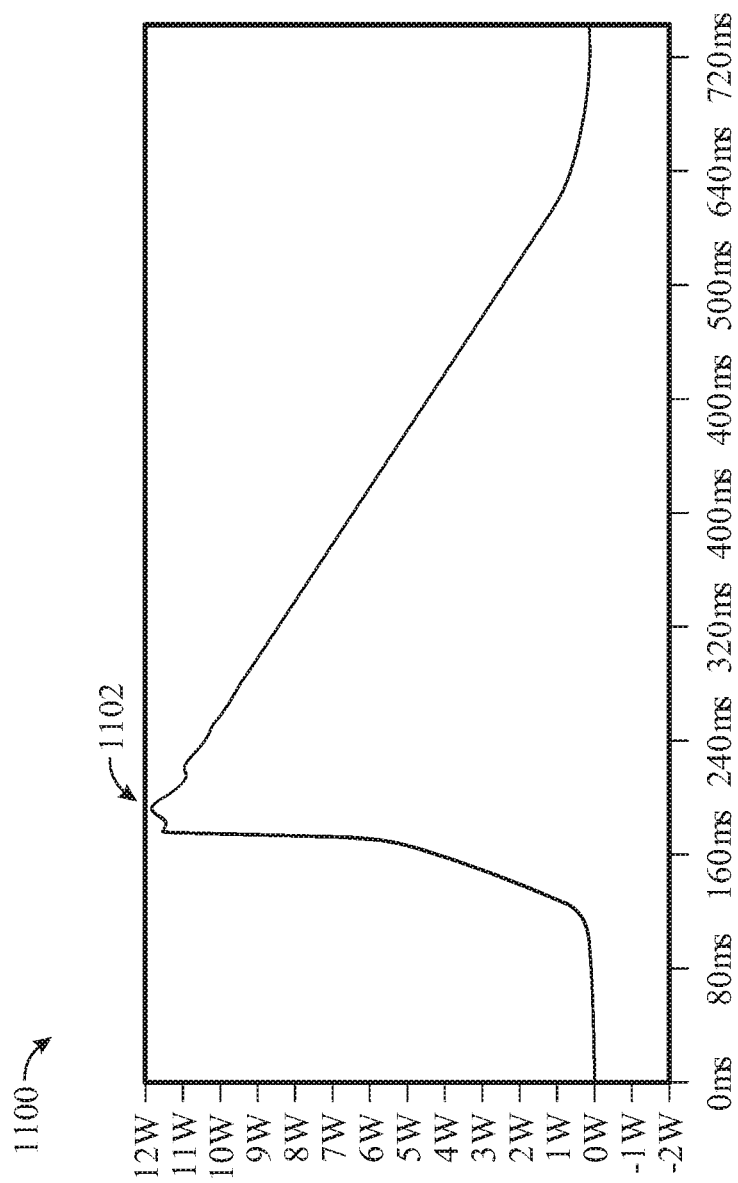
FIG. 11 illustrates an exemplary in-rush power dissipation spike of the soft start ramp circuit of FIG. 9.

FIG. 11 provides a plot 1100 of the ramp period and the power dissipated by the power supply 134 of the OMC 100. More specifically, FIG. 11 illustrates an in-rush power dissipation spike 1102 of the LM317A of FIG. 10 and depicts peak power dissipation over 12 Watts. In a small outline transistor SOT-223 package, this would mean that the die temperature would raise about 10° C. above ambient during this interval. With an 85° C. maximum OMC operational ambient temperature, this would place the device well below the 125° C. junction maximum where the LM317A would enter thermal shutdown. Note that diode 1010 (D5) in FIG. 10 is to prevent the destruction of capacitor 1008 (C3) and the LM317A during an input short circuit. The capacitor 1008 (C3) may be a tantalum capacitor and it should have its voltage ramped slowly up and down to prevent thermal failure. If the input power pins were to be shorted together, the LM317A would discharge capacitor 1008 (C3) immediately through the low impedance path in the ADJ pin. This would destroy the LM317A and likely cause thermal damage to capacitor 1008 (C3.) The blocking diode 1010 (D5) prevents this and allows capacitor 1008 (C3) to ramp down slowly into the OMC load.

Figure 12:
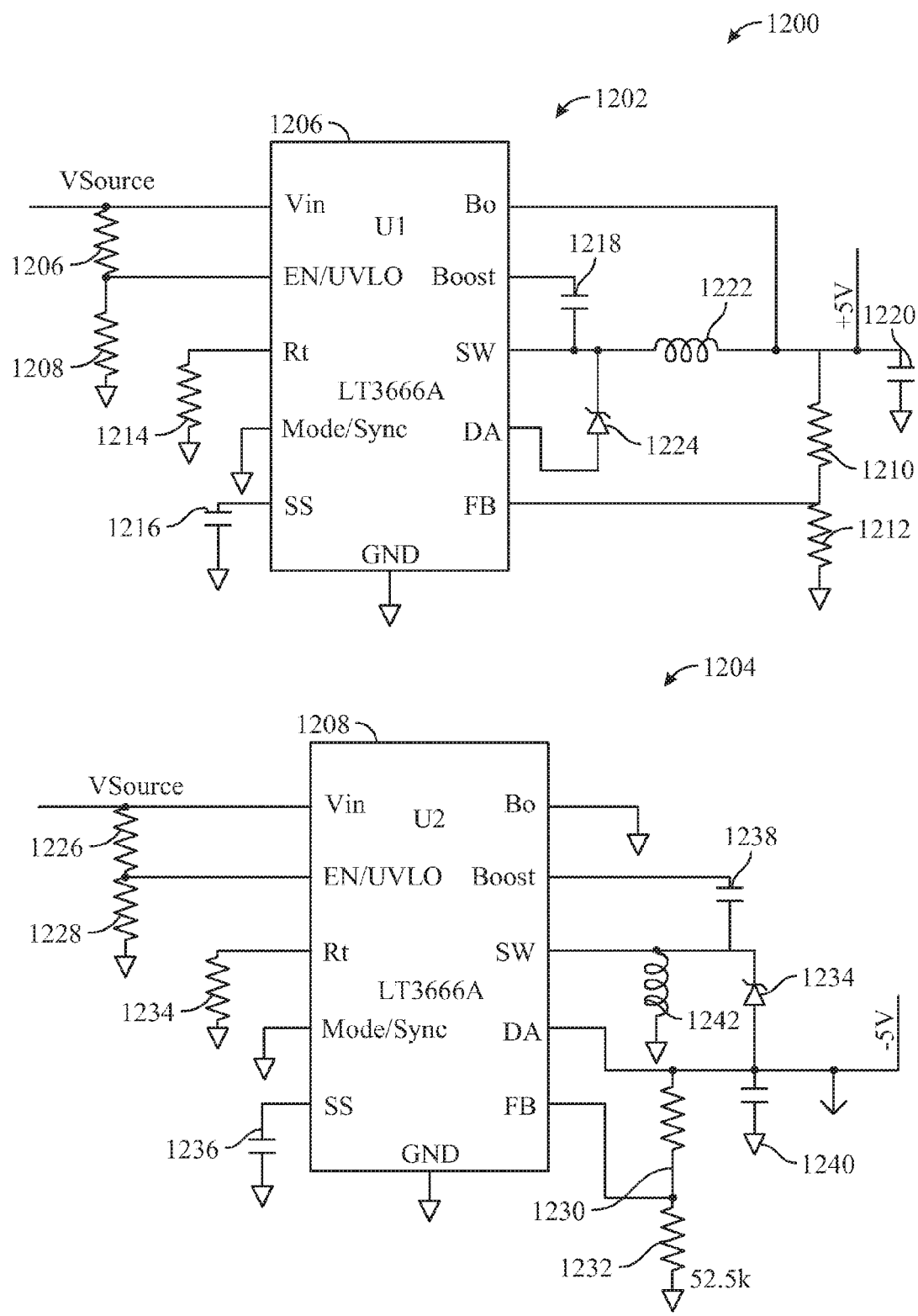
FIG. 12 is a schematic diagram of switching regulators of the power supply of the OMC of FIG. 1.

FIG. 12 illustrates the main switching regulators 1200 of the power supply 134, including a pair of buck regulators 1202 and 1204. Two switching regulators derive the 5 VDC and −5 VDC that supply power to the majority of circuits in the OMC 100. They are supplied by the 30 VDC common-mode input from the stub interface less the voltage loss incurred by an LM317A current limiting circuit. This loss can be as high as 3 VDC, which provides a nominal 27 VDC to the switching regulators during startup. The switching regulators of FIG. 12 operate at 300 kHz and each employ an LT3686A integrated circuit (IC), 1206 and 1208, respectively, where the LT3686A is a product of Linear Technology Corporation. The 300 kHz fundamental, and its third harmonic, are below the operational frequency range of the analog circuits in the OMC 100. The LT3686A ICs have a built-in soft-start that engages once the undervoltage lockout is released. The undervoltage lockout disengages at 24 VDC in order to provide a margin beneath the worst-case 27 VDC input to the regulators. Both regulators are constructed as buck regulators with the −5 VDC being an inverting buck configuration. Various other devices are connected as to the regulator 1206 as shown including: resistors 1206 (169 k ohm), 1208 (10 k ohm), 1210 (52.5 k ohm); 1212 (10 k ohm) and 1214 (280 k ohm); capacitors 1216 (3 n), 1218 (0.27 μF), 1220 (68 μF); inductor 1222 (47 μH); and a diode 1224 (with the listed device values merely being exemplary.) Various other devices are connected as to the regulator 1208 as shown including: resistors 1226 (169 k ohm), 1228 (10 k ohm), 1230 (10 k ohm), 1232 (52.5 k ohm) and 1234 (280 k ohm); capacitors 1236 (3 n), 1238 (0.22 µF), 1240 (68 µF); inductor 1242 (47 µH); and a diode 1234 (with the listed device values again merely being exemplary.)

Insofar as the digital logic voltage sources are concerned, the 5 VDC supply generates several smaller voltages for use in the digital logic section 104 of the OMC design. In one example, these consist of a 3.3 VDC signal for an IGLOO™ nano low power FPGA's I/O bank voltage and a 1.5 VDC core voltage for the same FPGA. (Note that IGLOO is a trademark of Microsemi Corporation.) In the exemplary system, there is one other voltage generated and that is an 18 VDC bias for the photodiode. This voltage is generated directly from the 30 VDC input voltage from the stub interface as this requires at most 1 µA of current. Each of these three voltages may be generated using a LDO.

The Digital CCA FPGA

Figure 13:
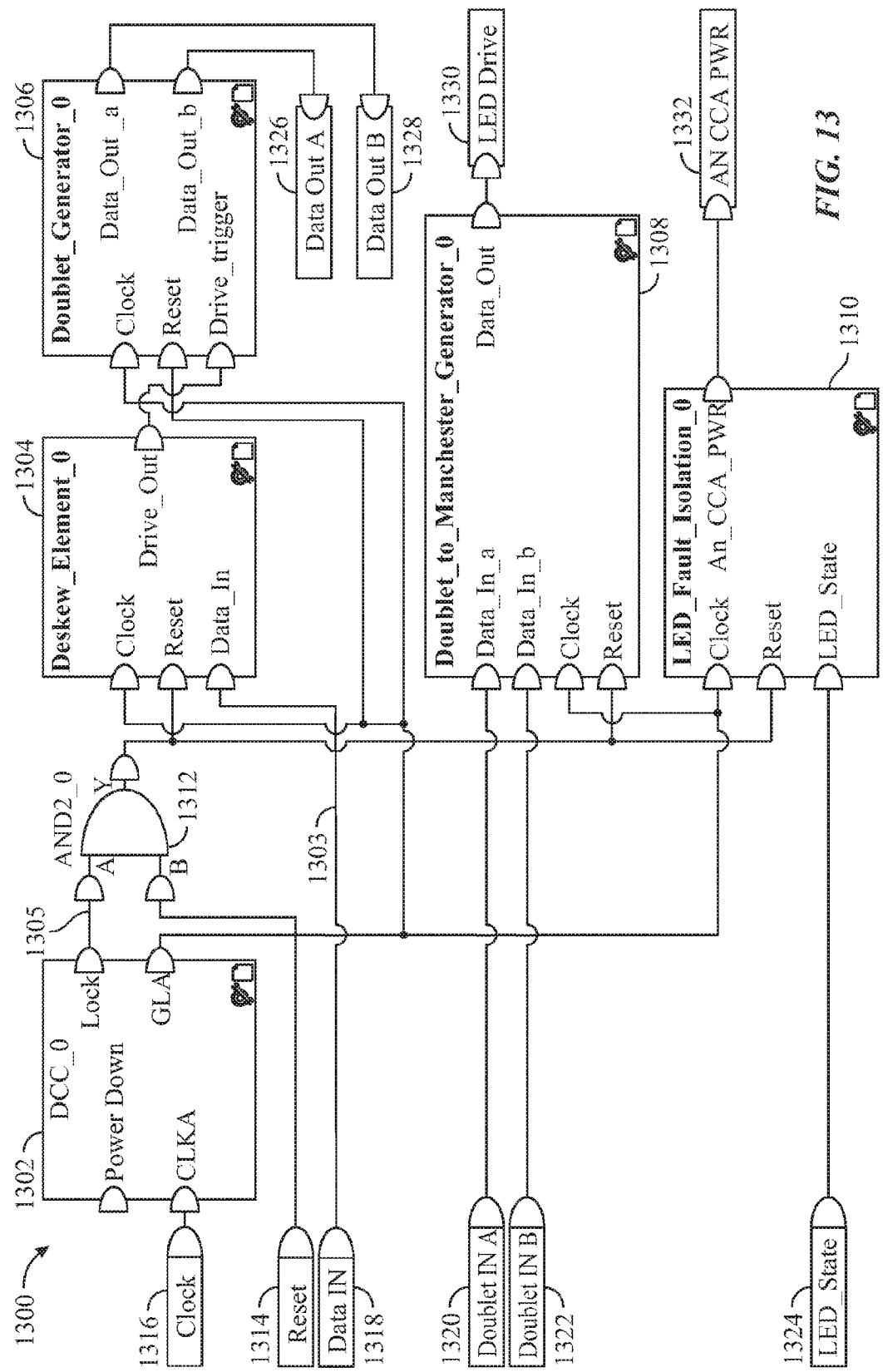
FIG. 13 is a schematic diagram illustrating a field-programmable gate array (FPGA) of a digital signal processing component of the OMC of FIG. 1.
Figure 14:
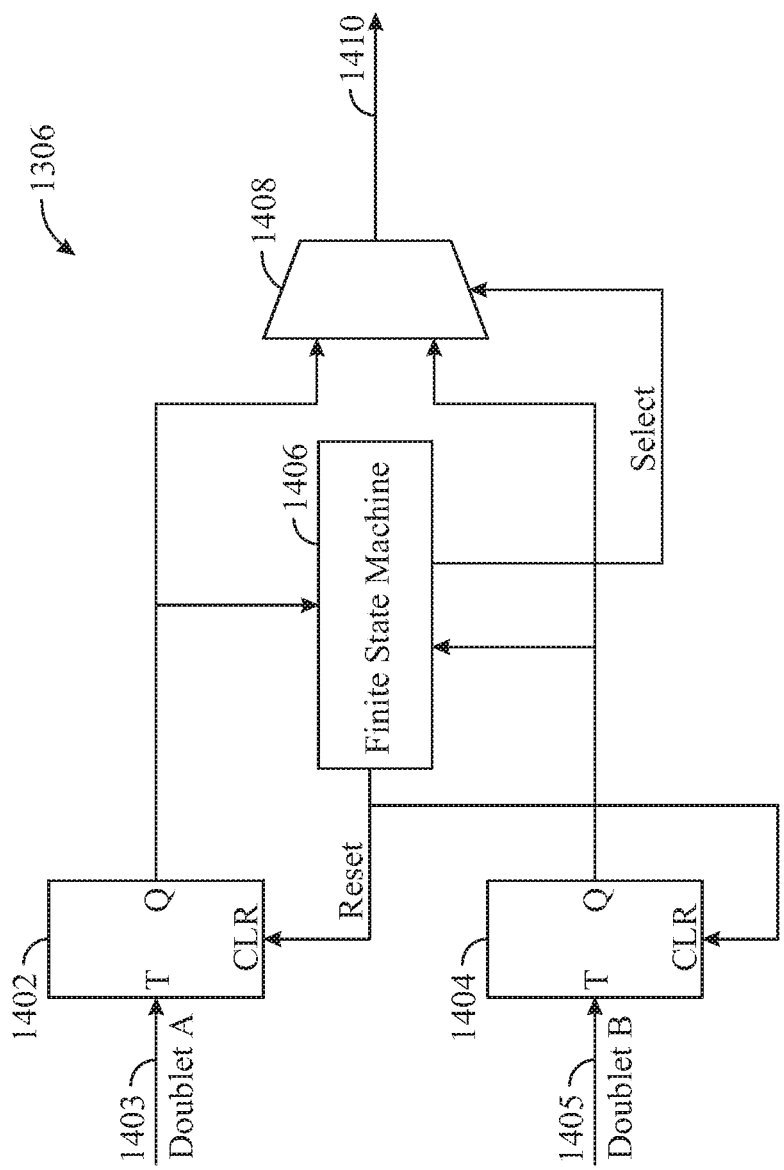
FIG. 14 is a schematic diagram illustrating a doublet-to-Manchester generator of the FPGA of FIG. 13.

FIGS. 13-14 illustrate various aspects of the digital CCA FPGA 104 of the OMC 100. Beginning with FIG. 13, a schematic diagram is provided that illustrates the logic connectivity of the FPGA 104. A clock conditioning circuit (CCC) 1302 takes an arbitrary input clock from 0.7 MHz to 250 MHz and outputs 64 MHz. The source clock is a CMOS oscillator with a 4001 is worst-case start up time. There are two outputs to this unit. The first 1303 is the 64 MHz derived clock used for the remainder of the FPGA circuitry. The second 1305 is a lock bit that must set, along with the external reset, in order release the FPGA circuitry to run. The CCC unit start-up is itself no longer than 300 µs. Note that the FPGA can instead be driven directly from an external 64 MHz clock source.

FIG. 13 also illustrates a deskew element 1304. A side effect of the analog circuitry in the OMC is an amplitude dependent modulation of received Manchester bitwidths. The downstream SIM can only tolerate an 8.8% variation in the doublet-to-doublet timing. The deskew logic section is configured to detect the synchronization pattern within word messages in a bit-stream and aligns the FPGA time-base to the synchronization pattern. The bits are then sampled with a 100 nanosecond (ns) delay and replicated using the local 64 MHz time-base. This removes the modulated bitwidths and provides a Manchester bit-stream to the SIM where each bit is 250 ns wide. An important aspect of the deskew element 1304 is its implicit handling of a LED reset event. The SIM device should always transmit an even number of doublets as digital bits are defined by having two edges. The very last doublet in a message string is truncated by the SIM transmitter and so every message sent by a SIM will have an odd doublet count. The SIM monitors the transmitted and received doublet counts and will quickly shutdown if the OMC 100 does not replicate the odd-count doublet wrap behavior. Note that the OMC 100 does not require an even number of doublets to function, but for thermal reasons the LED cannot be allowed to be stuck-on at high temperatures. This stuck-on behavior would occur if an odd doublet count were allowed. The deskew element 1304 has a time-out that resets the unit if it detects bus-quiet for 1078 ns. The reset state filters out any high to low transitions on the bus. This means that the FPGA can reset the LED after a 1078 ns time window has elapsed and the FPGA will receive the resulting high to low transition, however, the FPGA will not then send a doublet to the SIM. This implicit filtering preserves the SIM's doublet count while allowing the LED to survive high temperature environments. FIG. 13 also shows a doublet generator 1306. A pair of 120 ns wide doublets are generated in this unit each time an edge arrives from the deskew element 1304. The widths are generated using the local 64 MHz clock source. These then drive the external buffer of FIG. 8 (discussed above.)

FIG. 13 also illustrates a doublet-to-Manchester-generator 1308 for generating Manchester signals from doublet signals and an LED fault isolation unit 1310, discussed below. An AND gate 1312 is connected between the CCC 1303 and the deskew element 1304 (and also receives a reset signal 1314.) Other input lines shown in FIG. 13 include: clock input 1316, DATA IN 1318, DOUBLET IN A 1320, DOUBLET IN B 1322 and LED STATE 1324. Output lines include: DATA OUT A 1326, DATA OUT B 1328, LED DRIVE 1330 and AN CCA POWER 1332.

FIG. 14 illustrates the doublet generator 1306. Doublets can be converted directly to Manchester using toggle flip-flops 1402 and 1404. An important aspect of the doublet generator is the availability of a reset capability provide by a finite state machine 1406 to prevent a stuck-on condition. The output of the doublet generator 1306 via multiplexer 1408 drives the OMC LED and if left on perpetually the LED device could be damaged, especially at high ambient operating conditions. The doublet-to-Manchester unit reset mechanism of device 1406 is a timer that expires after 1094 ns, which is longer than the longest possible valid ARINC-629 static Manchester level. The longest high level event occurs during the first sync pattern in a message where the sync bit can be 750 ns, followed by a 250 ns Manchester bit at the same level. Additionally, note that the doublet-to-Manchester generator has two inputs DOUBLET A 1403 and DOUBLET B 1405. Either can drive the LED and are present because the SIM can potentially send doublets in two polarities. Two toggle flip-flops, 1402 and 1404, run off separate inputs. Each input is derived from a rectified doublet lobe. The state machine 1406 also manages which flip-flop is multiplexed to the output based on which input is driven first. The multiplexing setting is maintained until a bus-quiet time out of 1094 ns. The bus-quiet time out also resets the flip-flops if either is left stuck-on by an odd number of doublets arriving. The time out 1094 ns value was chosen to interleave with the deskew element 1304 unit time out value of 1074 ns. The multiplexer 1408 provides the output along MANCHESTER OUT line 1410.

Insofar as LED fault isolation of FIG. 13 is concerned, during pulsed operation the LED does not consume a large amount of power. However, if the LED were to become stuck-on, due to a failure of the LED itself or the field effect transistor (FET) that drives it, an appreciably large DC current could be drawn from the 5 VDC supply. This current would not be detected by the SIM over-current protection as it would not be large enough when reflected back to the 30 VDC supply. The LED fault isolation unit 1310 detects the voltage level at the transistor switch that controls the LED. If it is stuck-on for greater than 1984 ns, the unit will cut the 5 VDC power to the analog CCA using discrete FETs on the digital CCA 104. The error condition is perpetual until the power supply is cycled. Cutting the 5 VDC power protects components from being thermally damaged.

The Analog CCA Components

Figure 15:
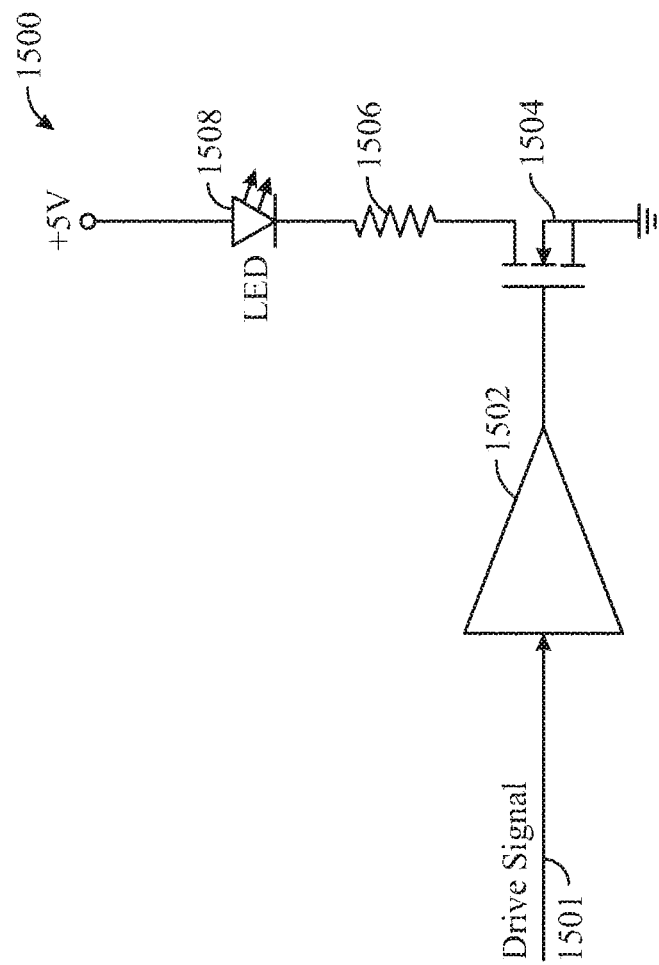
FIG. 15 is a schematic diagram illustrating a transmit circuit of an analog processing component of the OMC of FIG. 1.
Figure 16:
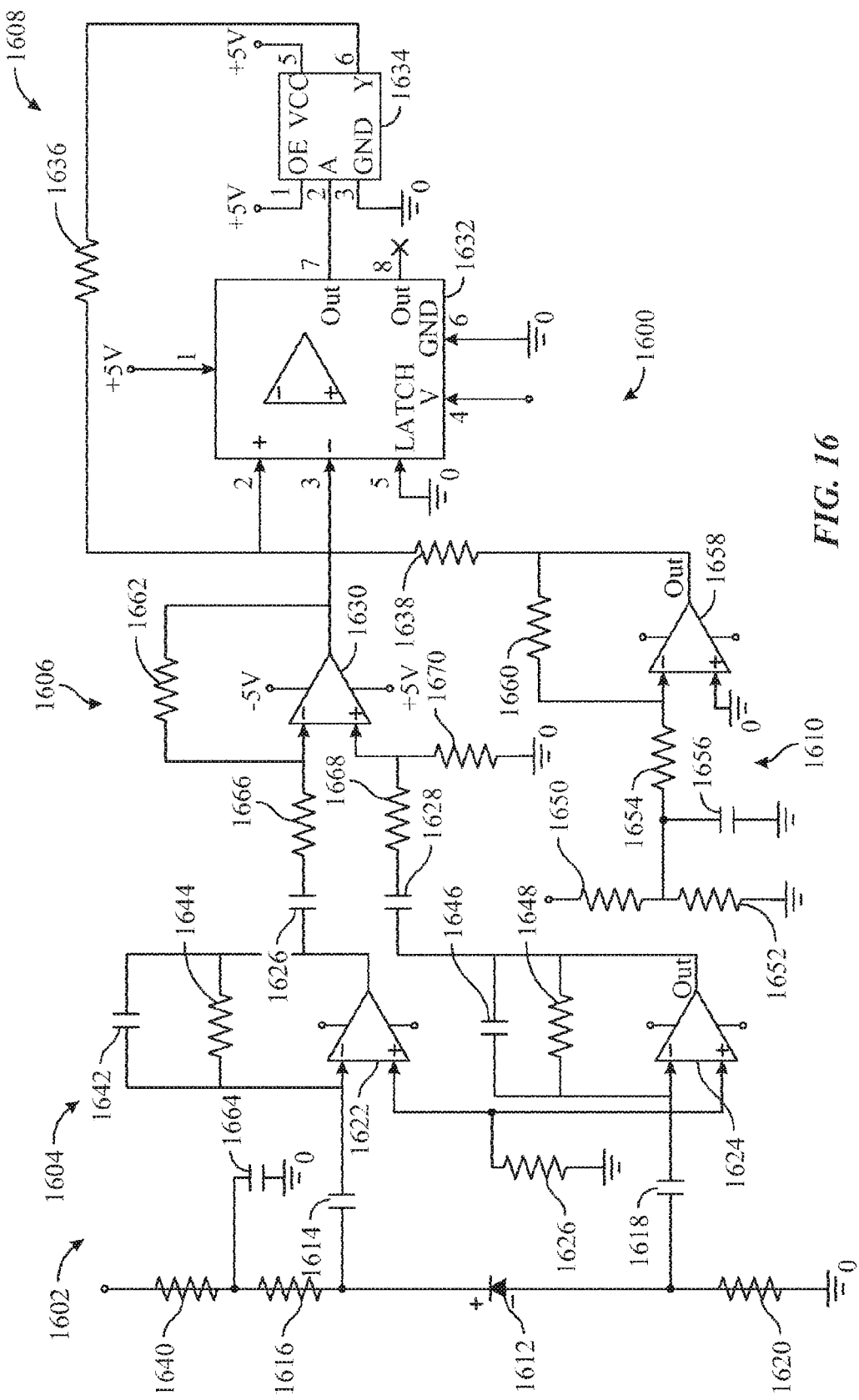
FIG. 16 is a schematic diagram illustrating a receiver circuit of the analog processing component of the OMC of FIG. 1.

FIGS. 15-16 illustrate various aspects of the analog CCA 106 of the OMC 100. Beginning with FIG. 15, a schematic diagram is provided that illustrates a transmit circuit 1500 of the analog CCA 106. Note that the transmit circuitry is controlled by the FPGA of the digital CCA 104 via a drive signal along line 1501. The analog CCA 106 may be designed as a buffer IC that is attached to the digital FPGA to compensate for the low FPGA drive strength so that the OMC can drive its output LED. Typically, there are two ways to pass digital bits through an optical element, such as an LED. The first method, which is employed by the transmit circuit 1500 of FIG. 15, is to drive the LED with a MOSFET switch 1504, which is driven completely from cutoff to saturation. In the example of FIG. 15, an amp 1502 receives the drive signal from the digital FPGA and feeds it to MOSFET 1504, which is connected via a resistor 1506 to an LED 1508. This is the slowest mode of operation for a MOSFET as it must traverse several modes of operation and completely charge and discharge the Miller capacitance at its input. For power MOSFETs capable of handling dozens to hundreds of milliamps this puts the practical digital switching speed limit to about 5 Mbit/s. This means that this method is applicable to the 2 Mbit/s Manchester bit stream utilized by busses such as ARINC 629 compatible busses.

Current-mode LED switching is another possible LED drive method that can achieve gigahertz switching speeds where switching speeds are limited by the LED itself. With current-mode switching, the LED is never completely turned off and idles with a low amount of light always transmitting. There has some impact on thermal performance using current-mode switching and it would require the use of a dedicated complex IC to control the current levels during switching. The AC-coupled input of OMC 100 is not impacted by the DC light offset emitted by idling current-mode transmitters. For the OMC 100, the simpler voltage control method of FIG. 15 is used as it requires only the LED, a resistor and a power MOSFET. The MOSFET 1504 is selected to have low on resistance and a low voltage threshold such that the device is strongly driven over all operating temperatures and conditions. Additionally, the total gate charge of the MOFSET 1504 is less than 1 nanoCoulombs (nC) so that it can be driven sufficiently rapidly for the target bit-rate. The LED element 1508 has logarithmic increases in light output with additional drive current. This means the upper limit of light output is largely specified by the particular LED design. However, this also means that this method of open-loop LED drive control has nearly constant light output in the presence of part aging and temperature. Output levels of 5 mW-average are achievable at the transmit duty-cycle of ARINC-629 over the operational temperature range of −40° C. to 85° C.

FIG. 16 is a schematic diagram illustrating a receiver circuit 1600 of the analog CCA 106 of the OMC 100. The receiver circuit 1600 has five main sections: a photodiode with bias section 1602, a TIA section 1604, an edge-coupled amplifier section 1606, a comparator circuit 1608, and a common-mode rejection circuit (not shown in FIG. 16.) Referring first to the photodiode section 1602, a photodiode 1612 (D1) is a PIN photodiode, which is reversed biased to 18 VDC in order to drive down its junction capacitance. During start up, a capacitor 1614 (C3) is charged through a resistor 1616 (R5) and each time a pulse hits the photodiode, the capacitor 1614 (C3) is slightly discharged and a capacitor 1618 (C7) is slightly charged. This shunting of current is equivalent to the photodiode 1612 (D1) lowering its resistance and shifting more of the bias voltage across the resistor 1616 (R5) and a resistor 1620 (R16). The supplied bias of +18 VDC allows the photodiode to maintain at least 10 VDC across itself with photocurrents present in the micro-amp range.

The capacitors 1614 (C3) and 1618 (C7) are AC coupling capacitors and are hundreds of times larger than the capacitance of the photodiode 1612 (D1.) The D1 capacitance dominates, since the three capacitances are in series and D1 is the smallest. In other words, the values of the capacitors 1614 (C3) and 1618 (C7) have almost no impact on circuit behavior and are provided to remove the DC bias from the input signal. These capacitors also create a low-impedance path for the photocurrent as they connect directly into the virtual grounds of two operational amplifiers (OP-AMPs) 1622 (U1) and 1624 (U6.) Hence, DC signals (which are the bias) go through resistors 1616 (R5) and 1620 (R16) but the AC signal (which is the signal of interest) goes through 1614 (C3) and 1618 (C7), thereby providing for a phase-splitting AC coupled input. Overall, this means that the bias circuitry is decoupled from the AC signal path. Note also that the phase of the signal traversing the capacitors 1614 (C3) and 1618 (C7) are 180° out of phase, hence constituting a phase-splitting circuit.

The pull-up and pull-down resistors 1616 (R5) and 1620 (R16), which apply an 18V bias, are set to large values for three reasons. First, they aid in decoupling the signal from the bias. Secondly, they are part of a filter on the power supply that rejects any ripple that might make it to the sensitive input stage. Third, resistors generate their own electronic noise and larger resistors generate less current noise. Note that, conventionally, the output of a photodiode would be directly connected into an amp with the anode or cathode connected directly to a voltage supply. However, in such a circuit, noise induced on the voltage supply could get back into the photodiode and so a DC coupled circuit would likely be used instead of an edge-coupled circuit.

Turning now to the TIA section 1604, amps 1622 (U1) and 1624 (U5) are TIAs, which were discussed generally above. The TIAs 1622 (U1) and 1624 (U5) each create an amplified representation of the photocurrent signal that is 180° out of phase with the other. They also have a large value resistor 1626 (R17) tying their positive reference pins together and then to ground. This provides common-mode rejection for both inputs and forces both amplifiers to experience the same common-mode input signal. That is, the resistor 1626 (R17) serves to reduce (or kill) the common mode bandwidth to little or nothing and hence reduces or eliminates any parasitic amplification, Also, any noise from the grounding structure is canceled out later in the circuit because it will be common to a pair of differential amps. More specifically, the signal and the common noise go through capacitors 1626 (C4) and 1628 (C5) and into a differential amp 1630 (U4) of the edge-coupled filter 1606, which takes the difference and reduces the common more significantly.

Thus, the edge-coupled filter/amplifier section 1606 includes amp 1630 (U4), capacitors 1626 (C4) and 1628 (C5) and various resistors (connected as shown) to provide an edge-coupled filter in a differential configuration. (See the discussion of edge-coupled filters above with respect to FIG. 5.) The amp 1630 (U4) takes the two amplified signals from the TIAs 1622 (U1) and 1624 (U5) and creates a single-ended output. This stage rejects common-mode signal that was coupled and amplified by the primary transimpedance stage. Note that capacitors 1626 (C4) and 1638 (C5) represent filtration capacitors. The amp 1639 (U4) is configured to charge the filtration capacitors within one bit of an input signal. Note that with conventional AC coupling, the circuit averages the amplitudes of an incoming signal before decoding. For the primary intended application of this circuit (i.e. processing signals in accordance with ARINC 629), no preamble is used. The edge-coupled filter circuit of FIG. 16 instead serves to resolves a settling time of each bit so there is no need for preamble. This is achieved, at least in part, by charging up the various filtration capacitors of the circuit within a bit of each bit of an input Manchester-encoded signal.

The comparator circuit 1608 includes an comparator latch 1632 (U2) configured as an IC with a level-shifted output. Hence, a latch is employed rather than a straight comparator. The output of the comparator latch 1632 (U2) is not consistent across temperature and drops below the 5 VDC rail. This variation is removed by buffering the comparator output with device 1634 (U3.) Resistors 1636 (R4) and 1638 (R10) provide a window of hysteresis for the comparator input signal. Since the input signal is centered at zero volts, this means that the comparator has two thresholds. One of these thresholds could not be negative though, because of the comparator's level-shifted output. This is handled by having resistor 1638 (R10) biased by a reference generator 1610 that allows for the comparator reference signal to swing negatively. Overall, these components turn the comparator latch 1632 (U2) into a Schmitt trigger, which allows the circuit to trigger on the bipolar input signal generated from the previous amplifier stage. It also means that the trigger holds state when the input signal recedes towards zero volts. This is important as the edge-coupled input will not hold its value after the trigger event occurs. (See FIG. 6, discussed above.)

Still further, note that the output of latch 1632 (U2) is fed back into Pin 2 via resistor 1636 (R4.) Accordingly, a dynamic threshold is provided whereby Pin 2 swings between −40 and +40 mV. That is, as device 1634 (U3) switches between 0 and 3 volts, latch 1632 (U2) switches between −40 and 40 mV and so the comparator 1608 essentially anticipates what the next bit should be. When at −40 mV, the compactor 1608 will not switch again unless the input goes further negative (i.e. lower than −40 mV.) Conversely, when the comparator 1608 is at 40 mV, it will not toggle again unless it goes above 40 mV. Recalling that the signal waveform (shown in FIG. 6) settles toward zero slowly, the custom Schmitt trigger of latch 1632 (U2) serves to hold the last state until the next bit comes through. Otherwise, there would likely be more bandwidth and more noise.

Insofar as common-more rejection is concerned, the devices 1632 (U2) and 1634 (U3) form the basis of the circuitry that recovers the digital bit-stream from the filtered analog signal but have one potential weakness. Often, comparators are used to digitize signals but there cannot be any feedback between the output and input. The reason is that, since the output of a comparator is digital, it will be connected to other digital devices and create a high-frequency current loop that could couple noise from the digital circuits into the analog processing section 106. Traditionally, comparators avoid excessive digital noise coupling by having resistors in-line with the power supply to the analog section. That is, the analog section is allowed to have significant impedance in its return path. This decouples the analog section from the digital noise but also means that the inputs to the comparator will see common-mode bounce. Provided the bounce is not excessive, the comparator can tolerate the equal bounce to both its inputs and reject it as it works on the difference between the input signals. This typically does not work, however, if there is a feedback path in the comparator circuit because the output, which is resistively isolated from the input, would be required to drive high-speed currents back into the input side. The OMC does utilize feedback and so the comparator circuit should reside entirely in the analog circuit section.

Other components shown in FIG. 16 include: resistor 1640 (R1), capacitor 1642 (CD, resistor 1644 (R2), capacitor 1646 (C6), resistor 1648 (R11), resistor 1650 (R13), resistor 1652 (R15), resistor 1654 (R14), capacitor 1656 (C8), amp 1658 (U5), resistor 1660 (R12), resistor 1662 (R3), capacitor 1664 (C2), resistor 1666 (R6), resistor 1668 (R8), resistor 1670 (R9), connected as shown. Exemplary values for devices shown in the figure are: resistor 1640 (R1)—100 k ohms, resistor 1616 (R5)—1M ohms, resistor 1620 (R16)—1M ohms, capacitor 1664 (C2)—500 pF, capacitor 1614 (C3)—500 pF, resistor 1626 (R17)—1 k ohms, capacitor 1618 (C7)—500 pf, capacitor 1642 (C1)—0.1 pF, resistor 1644 (R2)—1M ohms, capacitor 1646 (C6)—0.1 pF, R11—1M ohms, 1626 (C4)—100 pF, 1638 (C5)—100 pF, resistor 1650 (R13)—6.19 k ohms, resistor 1652 (R15)—69.9 ohms, resistor 1662 (R3)—1 k ohms, capacitor 1656 (C8)—0.1 µF, resistor 1654 (R14)—10 k ohms, resistor 1660 (R12)—10 k ohms, resistors 1636 (R4)—69.9 k ohms, resistor 1638 (R10)—1 k ohms, resistor 1666 (R6)—1 k ohms, resistor 1668 (R8)—1 k ohms, and resistor 1670 (R9)—1 k ohms.

Figure 17:
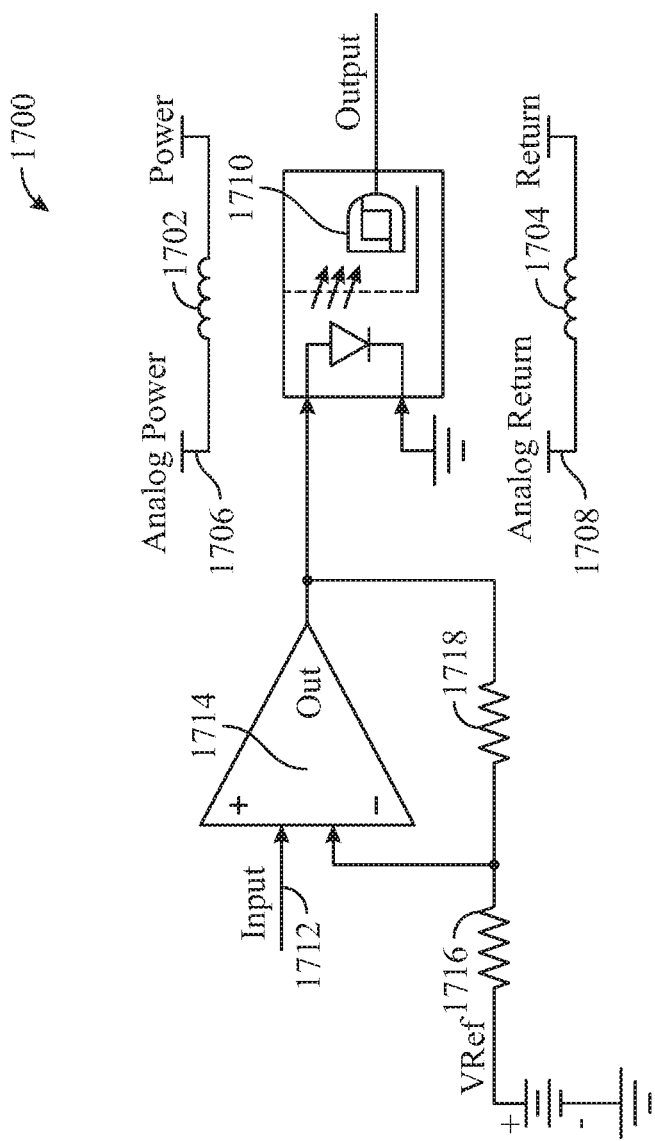
FIG. 17 is a schematic diagram illustrating an OMC isolation circuit of the transmit circuit of an analog processing component of the OMC of FIG. 1.

FIG. 17 illustrates an isolation circuit 1700 for use in analog common-mode rejection. Analog isolation in the OMC 100 is provided by placing small coils 1702 and 1704 in-line with the power supply lines 1706 and 1708, instead of resistors. This allows for high levels of noise filtering from the digital side while providing a lower voltage drop in the power supply than would be achieved with resistors. The receive signal is coupled from the analog section into the digital section using an optocoupler device 1710. More specifically, an output of the latch 1632 of the receiver 1600 of FIG. 16 is received as input 1712 by the circuit of FIG. 17. The input 1712 is fed into an amp 1714, which also receives VREF via a resistor 1716. A feedback resistor 1718 is also employed. The output of amp 1714 is fed into the optocoupler 1710. Note that the isolation achieved using the inline coils 1702 and 1704 is not galvanic, but it significantly rejects common-mode noise. Note also that most TIAs use resistive isolation between digital and analog circuits rather than inductive. Typically, with resistive isolation, the comparator is floated between the two sections of the circuit (digital vs. analog.) Inductive isolation, however, allows for better high frequency performance. When resistive isolation is used, the resistance is the same at every frequency until the frequencies became so high that the resistor essentially becomes a capacitor instead (typically around 5-10 gigahertz for a quality resistor.) However, with inductive isolation, much high impedances can be achieved, at least well above 300 kilohertz. Still further, note that in OMC 100, the analog and digital sides of the circuit are not completely isolated as would be the case with conventional opto-isolators where the power supplies (for the digital and analog circuits) are completely isolated. Moreover, note that with the OMC 100, the digital signals cannot be simply looped back to the digital and analog sides of the device at the same time. The isolation circuit of OMC 100 allows for feeding back the digital circuit of the digital side while also allowing the local comparator to feedback.

Still further, note also that it is possible for transmitters to clash while setting up transmission slots on the optical data bus 128. A clash occurs because of delay differences between transmitters. Each transmitter is assigned a hold off before attempting to use the data bus after the bus goes quiet. If the path length difference between two nodes is considerable then one device may transmit and another may not receive the data before it too tries to transmit. In particular, the gaps between transmitters are 1 µs. If the difference in path lengths between two terminals is more than this value then the terminals may clash. The terminal controllers will back off when they interpret the clash and attempt to transmit at a different time slot on the data bus. The fiber-optic data bus may not cause two terminals to notice a clash. If one transmitter is much stronger than the other and begins transmitting first then its signal will dominate and be received by other terminals. Otherwise, both terminal messages will be corrupted.

Insofar as performance metrics are concerned, the sensitivity of the OMC 100 was discussed and defined above. In context, the sensitivity refers to the lowest average light power that can be received by the circuitry and still result in an acceptable BER. Theoretical limits to sensitivity for the OMC 100 can be calculated by plugging the following values into the equivalent input referred current noise figure discussed above in connection with TIA noise. An additional factor is added here to simplify the conversion into optical wattage in dBm at a 10E-9 BER. Sensitivity is measured here as dBm-average, as it is arrived at based on the RMS power of the noise signal.

$$I_n = 1.3 \text{ fA/Hz}^{1/2}$$

$$E_n = 4.8 \text{ nV/Hz}^{1/2}$$

$$F = 5.5 \text{ MHz}$$

$$C_d = 7.5 \text{ pF}$$

$$R_f = 1 \text{ M}\Omega$$

$$I_{eq} = 0.712 \text{ pA/Hz}^{1/2}$$

$$P_{BER\ 10E-9} = 10 \log_{10}(6 I_{eq} F^{1/2}/0.44\ 1E\text{-}3) = -46.9 \text{ dBm-average}$$

In a receiver circuit, dynamic range refers to the input signal range that allows for a successful recovery of a signal. At the low end it is bounded by the receiver sensitivity. At the high end it is bounded by the saturation of the amplifiers due to supply voltage limits. The low end of the OMC design triggers at ±35 mVpp. This corresponds to an input light level of 159 nW-peak. The amplifiers saturate at an input current of 7.5 μA. This corresponds to an input light level of 17 μW-peak. The range between the high and low end is then 20.3 dB. An important consideration for AC-coupled circuits is the settling-time, which can cause interference between different input signals from different transmitters. If one transmitter is low amplitude and follows a large amplitude transmitter closely then residual energy in the receiver coupling can prevent data recovery. As the spacing between messages increases the interference effect diminishes logarithmically towards zero. The de-rated metric for the effective dynamic range that the system can utilize for a given message spacing is called the inter-message dynamic range. As a point of reference the inter-message spacing required to achieve the full dynamic range of the OMC receiver circuit is 1.1 μs.

The Optical Interface

Figure 18:
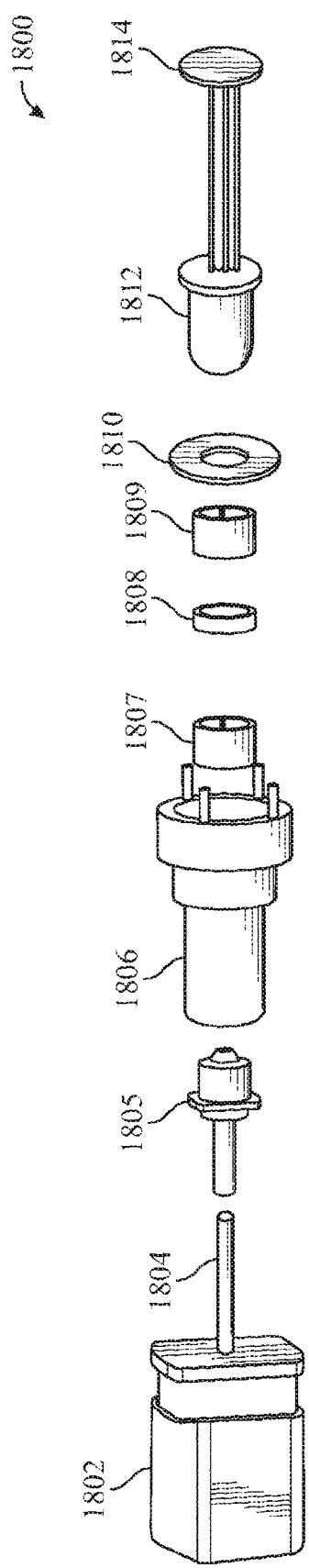
FIG. 18 is a perspective exploded view of a TOSA of the OMC of FIG. 1.
Figure 19:
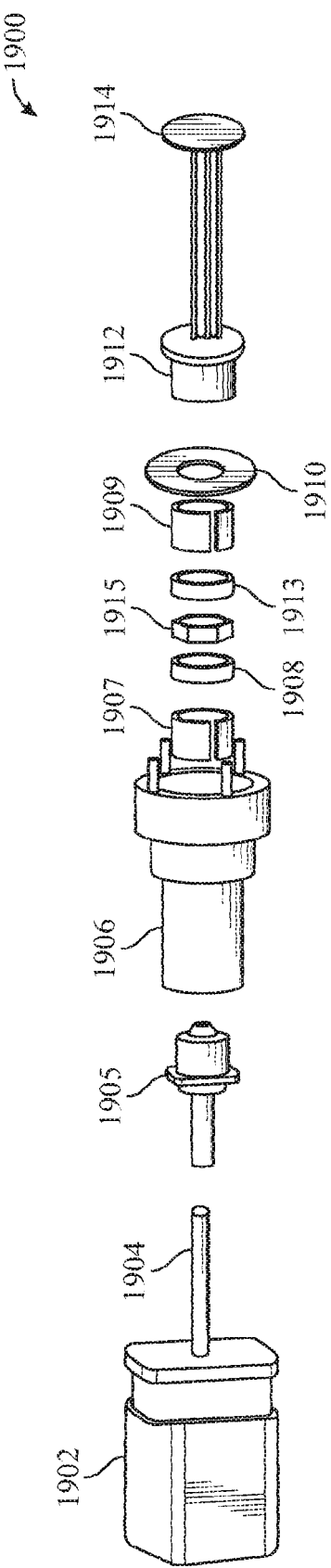
FIG. 19 is a perspective exploded view of a ROSA of the OMC of FIG. 1.

FIGS. 18-19 illustrate the TOSA 124 and the ROSA 126 of the OMC 100. The OMC TOSA and ROSA consist of two lens tubes that hold spacer rings as well as focusing lenses as depicted in the figures. Additionally, the transmit LED and receive photodiode are housed inside the lens tubes. The plastic fiber-optic cable is terminated at the cable side connector. The TOSA and ROSA each respectively have a ferrule attached that contains a PCS lightpipe that is mounted into a MIL-T-29504 style termination. The 29504 termination abuts the plastic fiber-optic cable against the PCS lightpipe to couple light into and out of the OMC. Hence, an intermediate hard silica fiber is used to provide fiber-to-fiber termination. In other words, the device is pre-aligned and pre-terminated without any significant pigtail, i.e. the device is connectorized.

Referring first to the exemplary TOSA 1800 of FIG. 18, the primary components include a connector receptacle insert (as may be provided by Deutsch™) 1802, a plastic clad silica (PCS) lightpipe 1804, machined housing components 1806, a bi-convex aspheric lens 1808 (mounted between a pair of retention sleeves 1807 and 1809), an O-ring 1810, a red LED 1812 and an insulating spacer 1814, connected as shown in the figure. Note that there are two major categories of transmitter devices, surface-emitting diodes and edge-emitting diodes. Surface-emitting LEDs have wide beam patterns and tend to be physically larger devices. With the large size come limitations in switching speed. The large beam pattern for surface-emitters means that external lenses are required to couple efficiently into fiber-optic cables. These devices have good performance thermally and lose about 1 dB of optical power between 27° C. and 85° C. Surface-emitting diodes also more fully fill a fiber on entry giving a more consistent exit beam pattern at various fiber lengths. Edge-emitting LEDs can be constructed to have narrower beam patterns and couple more easily into fiber-optic cables. They are physically smaller devices than surface-emitting diodes and thus cannot generate as much light due to thermal considerations. They are not as efficient electrically at converting current into optical power. Edge-emitters operate at higher frequencies and are more susceptible to variations in temperature with a loss of output drive of 2 dB to 3 dB from 27° C. to 85° C. A surface-emitting 650 nm LED was selected because of the low speed operation required of the OMC and the high optical power budget.

FIG. 19 illustrates the ROSA 1800. The primary components are similar to those of the TOSA and include a connector receptacle insert 1902, a PCS lightpipe 1904, machined housing components 1906, a pair of bi-convex aspheric lens 1908 and 1913 (mounted among three retention sleeves 1907, 1915 and 1909), an O-ring 1910, a silicon PIN LED 1912 and an insulating spacer 1914, connected as shown in the figure. The receiver part selection is typically between PIN photodiodes and avalanche photodiodes. PIN photodiodes are PN-junction diodes constructed with a large depletion region. A small reverse bias can increase the depletion width and reduce the device's capacitance. It generates hole/electron pairs when photons impact the depletion region and the pairs cause current to flow in attached circuits. The efficiency of a PIN photodiode is between 0.4 Amps/Watt to 0.6 Amps/Watt. They are exceptionally linear down to single pico-amps of photocurrent. Reverse bias voltages vary from 5 VDC to 30 VDC. Avalanche photodiodes use a photomultiplication effect caused by a large reverse bias placing the photodiode in avalanche mode. Each time a photon impacts the diode hole/electron pairs are generated but they in turn excite other hole/electron pairs. This cascading effect can occur hundreds or thousands of times which creates very large gains in terms of Amps/Watt of incident photopower. A trade-off is that avalanche diodes require hundreds or thousands of volts of reverse bias in order to function. Additionally, the gain varies considerably with temperature and they create an additional noise term that depends on the inconsistent gain. A PIN photodiode 1912 was selected for the OMC owing to its simple low-voltage operation and its linearity and consistency over temperature.

Insofar as optical coupling is concerned, the transmit LED of the TOSA contains two internal lenses that generate an output beam pattern that is roughly collimated with an 8° half-beam angle. The beam is too wide to couple directly into a 1 mm plastic fiber-optic cable. An additional lens has been added after the LED to bend the beam back in towards the fiber. Theoretical maximum coupling for LEDs into plastic fiber-optic cables is about 70%. On the other end of the fiber is the receive PIN photodiode. The light emitting from the fiber end will have a 30° half beam angle. This would require a large detector to capture the light and so two lenses are used to first collimate and then focus the light onto a smaller detector. Detection efficiency can approach 100%.

Exemplary System Interconnected with Star Coupler

Figure 20:
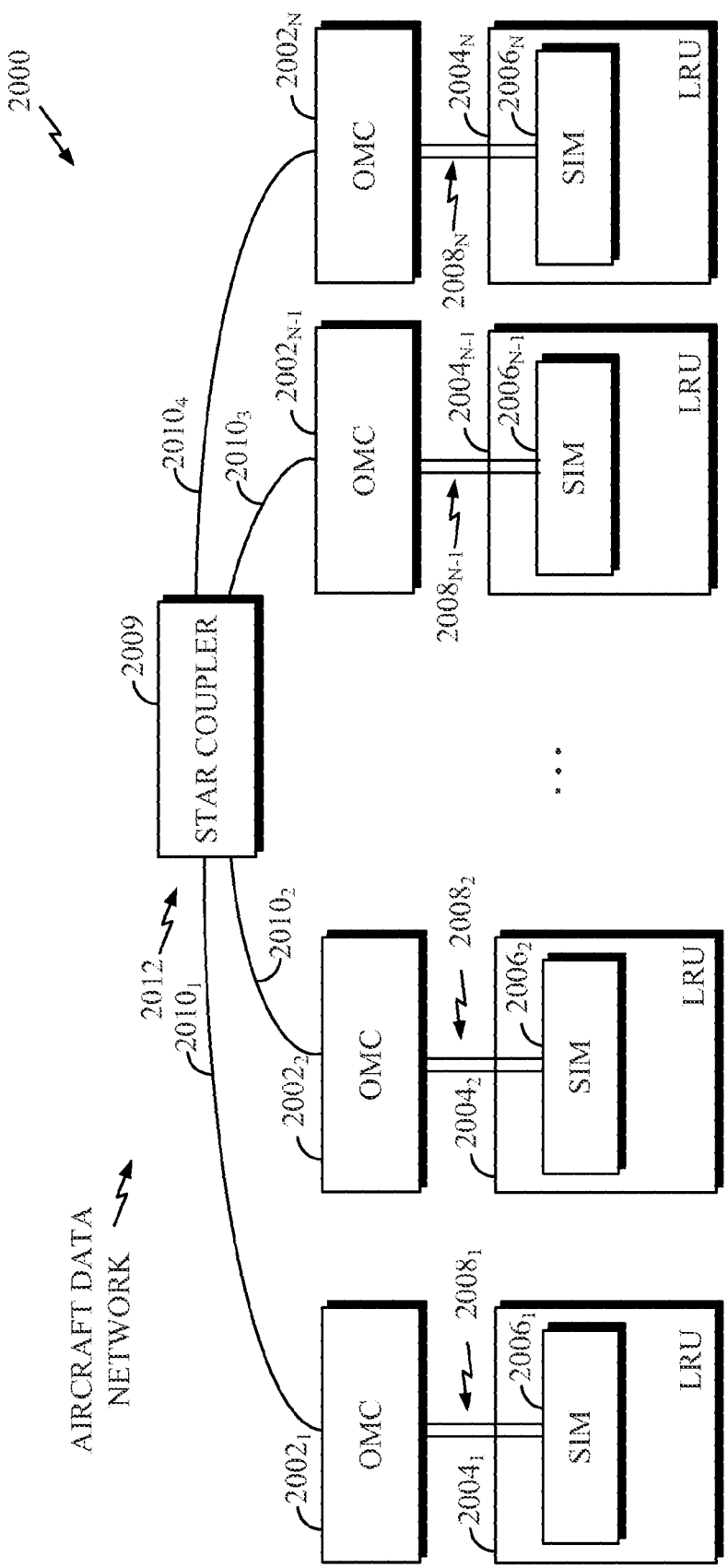
FIG. 20 is a block diagram illustrating an aircraft data network composed of various LRUs interconnected to an optical data bus via OMCs such as the one of FIG. 1.

FIG. 20 illustrates an aircraft data network 2000 having a set of N OCMs $2002_{1...N}$, each connected, on an electrical side, to an LRU $2004_{1...N}$ having a SIM $2006_{1...N}$ via an electrical (SIM) data bus $2008_{1...N}$, and connected, on the optical side, to a star coupler 2009 via a corresponding optic fiber $2010_{1...N}$. Components within each of the LRUs may communicated with any of the other LRUs via time division multiplexing of signals over an optical data bus 2012 composed of the various optical fibers and the star coupler. The individual LRUs may correspond, for example, to components of a primary flight computer (PFC) or various actuator control electronics (ACE) units.

Summary of Exemplary Apparatus, Devices and Methods

One or more of the components, steps, features, and/or functions illustrated in the figures may be rearranged and/or combined into a single component, step, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures.

Figure 21:
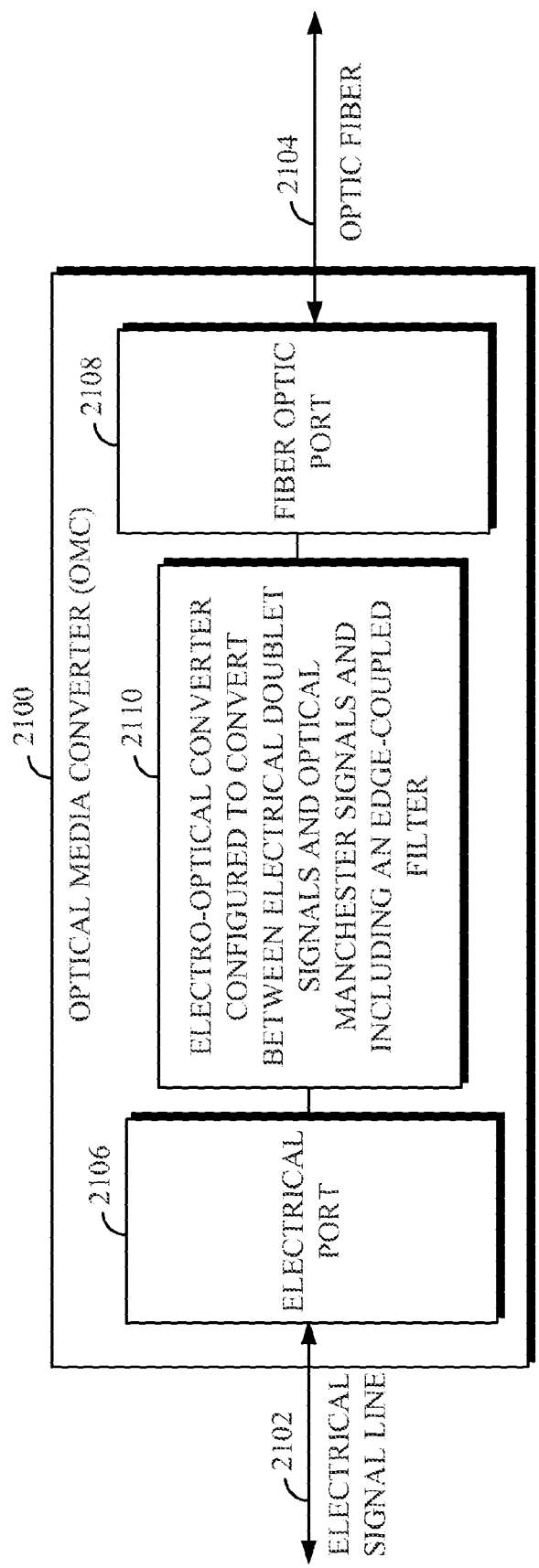
FIG. 21 illustrates and summarizes an exemplary OMC.

FIG. 21 broadly illustrates an OMC 2100 for coupling an electrical signal line 2102 (which may form part of an electrical signal bus system of an aircraft data network) and an optic fiber 2104 (which may form part of an optical signal bus system of the aircraft data network.) The OMC 2100 includes an electrical port 2106 adapted to couple to the electrical signal line 2102 and a fiber optic port 2108 adapted to couple to the optic fiber 2104. An electro-optical converter 2110 is configured to convert between electrical doublet signals for transmission on the electrical signal line and optical Manchester signals for transmission on the optic fiber and includes at least one edge-coupled filter. As noted above, the term electro-optical converter as used herein broadly refers to a device capable of converting electrical signals to optical signals, optical signals to electrical signals, or both. Hence, the term is not meant to imply that the device only converts from electrical to optical. For example, the electro-optical converter 2110 may convert electrical doublet signals to optical Manchester signals and also convert optical Manchester signals to electrical doublet signals. Typically, the edge-coupled filter is employed in the conversion of optical Manchester signals to electrical doublet signals.

Figure 22:
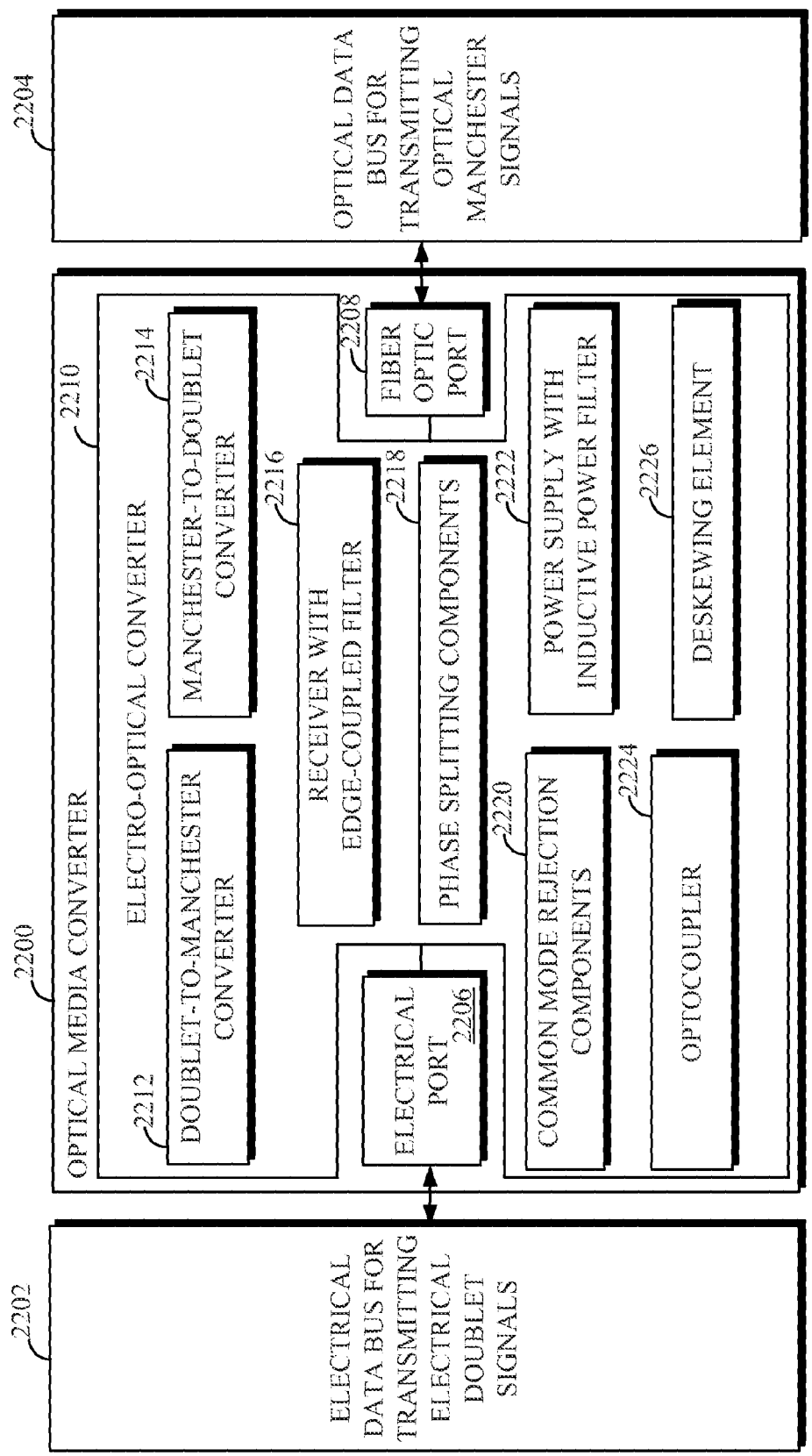
FIG. 22 illustrates the exemplary OMC of FIG. 21 in greater detail.

FIG. 22 further illustrates components of an exemplary OMC 2200, which is coupled between an electrical data bus 2202 for transmitting electrical doublet signals and an optical data bus 2204 for transmitting optical Manchester signals. Components of the exemplary OMC 2200 include an electrical port 2206 for coupling to the electrical data bus 2202, a fiber optic port 2208 for coupling to the optical data bus 2204, and an electro-optical converter 2210 for converting between electrical doublet signals for transmission on the electrical signal line and optical Manchester signals for transmission on the optic fiber. Components are provided within the electro-optical converter 2210 that convert electrical doublet signals to optical Manchester signals and other components are provided that convert optical Manchester signals to electrical doublet signals. For generality and clarity, components of the electro-optical converter 2210 are shown as separate units. It should be understood, however, that there may be overlap among components (e.g. a single circuit might implement multiple functions) and some components may be sub-units or sub-systems of other components. Exemplary implementations are described above with reference to FIGS. 1-20.

Briefly, the electro-optical converter 2210 of FIG. 22 includes a doublet-to-Manchester converter 2212 configured to convert electrical doublet signals to optical Manchester signals and a Manchester-to-doublet converter 2214 configured to convert to optical Manchester signals to electrical doublet signals. A receiver 2216 with an edge-coupled filter is provided that, in at least some examples, includes a filtration capacitor, a feedback resistor, and an amplifier configured to charge the filtration capacitor within one bit of a Manchester-encoded input signal. Phase splitting components 2218 are provided that, in at least some example, includes transimpedance amplifiers operative to generate amplified representations of a Manchester-encoded input signal wherein the representations are 180° out of phase with the one another for phase splitting. Common mode rejection components 2220 are provided. A power supply with an inductive power filter 2222 may be provided to, e.g., isolate a power loop of an analog portion of the OMC from a digital portion of the OMC. An optocoupler 2224 is provided to couple analog signals from the analog portion of the OMC to digital signals for use in the digital portion of the OMC. The inductive power filter 2222 may include inductive isolation component comprising coils connected in-line with analog circuit power supply lines associated with the optocoupler (as discussed above.) A deskewing element 2226 is provided to deskew edge-couple filtered versions of Manchester-encoded input signals to obtain deskewed signals from which bits are obtained for conversion to doublets.

As such, an optical media converter is described herein that includes: means for receiving optical Manchester signals from an optic fiber; means for edge-couple filtering the optical Manchester signals; means for converting the edge-couple filtered Manchester signals to electrical doublet signals for transmission on an electrical signal line; means for receiving electrical doublet signals from an electrical signal line and means for converting the electrical doublet signals to optical Manchester signals for transmission on the optic fiber.

Figure 23:
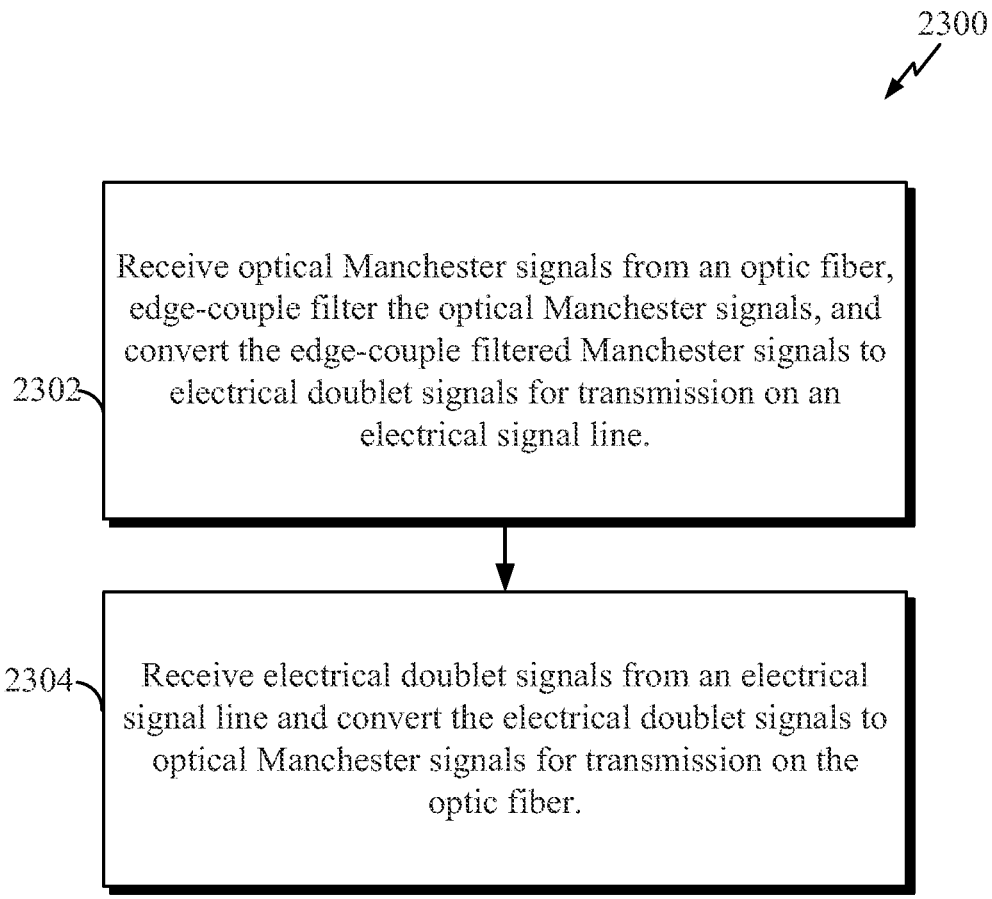
FIG. 23 summarizes a method for optical media conversion.

FIG. 23 summarizes a method for optical media conversion that may be performed by the OMC systems of FIGS. 1-22 or other suitably equipped devices. Briefly, at step 2302, the system receives optical Manchester signals from an optic fiber, edge-couple filters the optical Manchester signals, and converts the edge-couple filtered Manchester signals to electrical doublet signals for transmission on an electrical signal line. Additionally, alternatively, or concurrently, the system, at step 2304, receives electrical doublet signals from an electrical signal line and converts the electrical doublet signals to optical Manchester signals for transmission on the optic fiber.

FIG. 24 summaries an exemplary method 2400 for converting optical Manchester signals to electrical doublet signals using a suitably-equipped OMC. At step 2402, the OMC receives optical Manchester signals from an optic fiber via a ROSA using a receiver circuit having transimpedance amplifiers operative to generate amplified representations of a Manchester-encoded input signal, wherein the representations are 180° out of phase with the one another for phase splitting and wherein a resistor connects positive reference pins of the transimpedance amplifiers to ground with sufficient resistance to substantially eliminate parasitic amplification and provide substantially complete common mode rejection. At step 2404, the OMC routes the Manchester-encoded input signal through an edge-coupled filter having an amplifier configured to charge a filtration capacitor of an input stage of the receiver circuit within one bit of a Manchester-encoded input signal to resolve a settling time of each bit so that no preamble is needed. At step 2406, the OMC router the edge-couple filtered signals through a through a Schmitt-trigger comparator latch to hold a state of the signals until a next edge-triggered signal is processed. At step 2408, the OMC routes an output signal of the Schmitt-trigger comparator latch through an optocoupler to couple analog signals from an analog portion of the OMC to digital signals for use in a digital portion of the OMC wherein an inductive power filter is employed including an inductive isolation component having coils connected in-line with analog circuit power supply lines to allow significant noise filtering. At step 2410, the OMC routes the digital signals through a deskewing element to deskew edge-couple filtered versions of the Manchester-encoded input signals to obtain deskewed signals and then to route the deskewed signals through a doublet generator to convert the deskewed signals into electrical doublet signals for output over an electrical signal bus.

Figure 25:
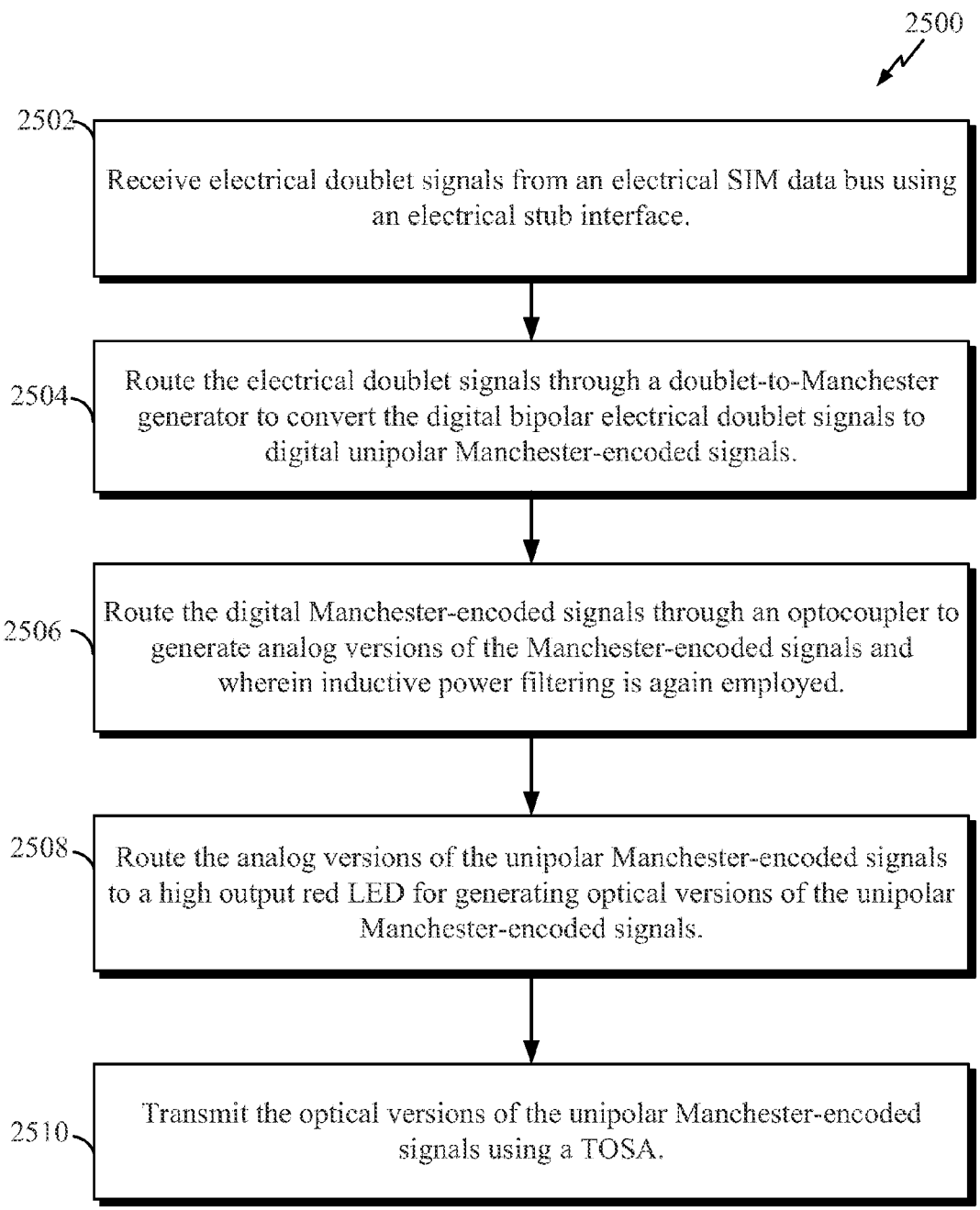
FIG. 25 summarizes a method for converting electrical doublet signals to optical Manchester signals using an OMC.

FIG. 25 summaries an exemplary method 2500 for converting electrical doublet signals to optical Manchester signals using a suitably-equipped OMC. At step 2502, the OMC receives electrical doublet signals from an electrical SIM data bus using an electrical stub interface. At step 2504, the OMC route the electrical doublet signals through a doublet-to-Manchester generator to convert the digital bipolar electrical doublet signals to digital unipolar Manchester-encoded signals. At step 2506, the OMC routes the digital Manchester-encoded signals through an optocoupler to generate analog versions of the Manchester-encoded signals and wherein inductive power filtering is again employed. At step 2508, the OMC routes the analog versions of the unipolar Manchester-encoded signals to a high output red LED for generating optical versions of the unipolar Manchester-encoded signals. At step 2510, the OMC transmits the optical versions of the unipolar Manchester-encoded signals using a TOSA.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An optical media converter, comprising:
    an electrical port adapted to couple to an electrical signal line;
    a fiber optic port adapted to couple to an optic fiber; and
    an electro-optical converter configured to convert between electrical doublet signals for transmission on the electrical signal line and optical Manchester signals for transmission on the optic fiber, the electro-optical converter including at least one edge-coupled filter configured to resolve a settling time.

2. The optical media converter of claim 1, wherein the electro-optical converter comprises:
    a doublet-to-Manchester converter configured to convert electrical doublet signals to optical Manchester signals; and
    a Manchester-to-doublet converter configured to convert to optical Manchester signals to electrical doublet signals.

3. The optical media converter of claim 1, further comprising a receiver circuit coupled to the fiber optic port, the receiver circuit including the at least one edge-coupled filter.

4. The optical media converter of claim 3, wherein the at least one edge-coupled filter of the receiver circuit is configured to charge at least one filtration capacitor of an input stage of the receiver circuit within one bit of a Manchester-encoded input signal.

5. The optical media converter of claim 3, wherein the receiver circuit includes first and second transimpedance amplifiers operative to generate first and second amplified representations of a Manchester-encoded input signal wherein the representations are 180° out of phase with the one another for phase splitting.

6. The optical media converter of claim 5, wherein a resistor connects positive reference pins of the first and second transimpedance amplifiers to ground with sufficient resistance to provide common mode rejection.

7. The optical media converter of claim 3, wherein the receiver circuit includes a Schmitt trigger comparator latch to hold a state of a Manchester-encoded input signal to provide analog to digital burst mode conversion.

8. The optical media converter of claim 1, further comprising a power supply having an inductive power filter to isolate a power loop of an analog portion of the optical media converter from a digital portion of the optical media converter.

9. The optical media converter of claim 8, further comprising an optocoupler to couple analog signals from the analog portion to digital signals for use in the digital portion and wherein the inductive power filter includes at least one inductive isolation component comprising coils connected in-line with analog circuit power supply lines.

10. The optical media converter of claim 1, further comprising:
    a deskewing element operative to deskew edge-couple filtered versions of Manchester-encoded input signals to obtain deskewed signals; and
    a doublet generator operative to convert the deskewed signals into electrical doublet signals.

11. The optical media converter of claim 10, wherein the deskewing element is operative to detect a synchronization pattern within a word message in a Manchester-encoded input signal bit-stream and align a time-base of a field-programmable gate array (FPGA) of the Manchester-to-doublet converter to the synchronization pattern of the word message.

12. The optical media converter of claim 10, wherein the edge-coupled filter is characterized as filtering signals not associated with edges within a time-varying input signal.

13. An optical media conversion method for use with an optical media converter, comprising:
 receiving optical Manchester signals from an optic fiber, edge-couple filtering the optical Manchester signals to resolve a settling time, and converting the edge-couple filtered Manchester signals to electrical doublet signals for transmission on an electrical signal bus; and
 receiving electrical doublet signals from an electrical signal bus signal bus and converting the electrical doublet signals to optical Manchester signals for transmission on an optic fiber.

14. The optical media conversion method of claim 13, wherein edge-couple filtering the optical Manchester signals comprises routing input Manchester-encoded signals through an edge-coupled filter of a receiver circuit wherein the edge-coupled filter is adapted to charge a filtration capacitor of an input stage of the receiver circuit within one bit of the input Manchester-encoded signals.

15. The optical media conversion method of claim 14, further comprising routing the filtered Manchester-encoded signals through a Schmitt-trigger comparator latch to hold a state of the signals until a next edge-triggered signal is processed.

16. The optical media conversion method of claim 13, further comprising routing at least some of the input Manchester-encoded signals through common-mode rejection components.

17. The optical media conversion method of claim 13, further comprising routing at least some of the Manchester-encoded signals through an inductive isolation circuit.

18. The optical media conversion method of claim 13, wherein converting the edge-couple filtered optical Manchester signals to electrical doublet signals further comprises:
 routing edge-couple filtered Manchester-encoded signals through a deskewing element to obtain deskewed signals; and
 routing the deskewed signals through a doublet generator to convert the deskewed signals into electrical doublet signals.

19. The optical media conversion method of claim 13, wherein edge-coupled filtering is characterized as filtering signals not associated with edges within a time-varying input signal.

20. An optical media converter, comprising:
 means for receiving optical Manchester signals from an optic fiber;
 means for edge-couple filtering the optical Manchester signals to resolve a settling time;
 means for converting the edge-couple filtered Manchester signals to electrical doublet signals for transmission on an electrical signal line;
 means for receiving electrical doublet signals from an electrical signal line; and
 means for converting the electrical doublet signals to optical Manchester signals for transmission on the optic fiber.

* * * * *